United States Patent
Lee et al.

(10) Patent No.: US 11,950,172 B2
(45) Date of Patent: Apr. 2, 2024

(54) TRANSMISSION OF GROUPCAST SERVICE IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 17/431,252

(22) PCT Filed: Feb. 24, 2020

(86) PCT No.: PCT/KR2020/002646
§ 371 (c)(1),
(2) Date: Aug. 16, 2021

(87) PCT Pub. No.: WO2020/171678
PCT Pub. Date: Aug. 27, 2020

(65) Prior Publication Data
US 2022/0132278 A1   Apr. 28, 2022

(30) Foreign Application Priority Data
Feb. 22, 2019   (KR) .......................... 10-2019-0021435

(51) Int. Cl.
*H04W 4/08* (2009.01)
*H04W 8/26* (2009.01)
(Continued)

(52) U.S. Cl.
CPC .............. *H04W 4/08* (2013.01); *H04W 8/26* (2013.01); *H04W 72/542* (2023.01); *H04W 76/14* (2018.02); *H04W 76/15* (2018.02)

(58) Field of Classification Search
CPC ....... H04W 4/08; H04W 8/26; H04W 72/542; H04W 76/14; H04W 76/15; H04W 4/44;
(Continued)

(56) References Cited

U.S. PATENT DOCUMENTS 9,622,138 B2 *  4/2017  Bontu ............... H04W 36/0094
10,374,818 B2 *  8/2019  Rodrigues ............. H04W 76/40
(Continued)

FOREIGN PATENT DOCUMENTS

KR    10-2012-0020132 A    3/2012

OTHER PUBLICATIONS

Intel Corporation, "SL MAC considerations for NR V2X", R2-1818178, 3GPP TSG-RAN WG2 Meeting 104, Spokane, Washington, USA, Nov. 12-16, 2018, see pp. 1-3.
(Continued)

*Primary Examiner* — Md K Talukder
(74) *Attorney, Agent, or Firm* — BRYAN CAVE LEIGHTON PAISNER LLP

(57) ABSTRACT

An embodiment of the present disclosure provides a method for a first apparatus for transmitting a groupcast service. The method comprises the steps of: determining, based on a plurality of unicast services received from a plurality of apparatuses, mapping information indicating the mapping relationship between the plurality of unicast services and a groupcast service; and transmitting, based on the mapping information, the groupcast service to a second apparatus and a third apparatus included in the plurality of apparatuses.

7 Claims, 25 Drawing Sheets

(51) Int. Cl.
*H04W 72/542* (2023.01)
*H04W 76/14* (2018.01)
*H04W 76/15* (2018.01)

(58) Field of Classification Search
CPC ....... H04W 76/40; H04W 92/18; H04W 4/40; H04W 8/005; H04W 4/06; H04W 4/46; H04W 4/70; H04W 8/22; H04W 28/24
See application file for complete search history.

(56) References Cited

U.S. PATENT DOCUMENTS

| | | | | |
|---|---|---|---|---|
| 10,420,034 | B1* | 9/2019 | Zheng | H04W 52/267 |
| 2011/0216685 | A1* | 9/2011 | Kish | H04W 28/04 |
| | | | | 370/312 |
| 2017/0127251 | A1* | 5/2017 | Yi | H04W 76/14 |
| 2018/0027390 | A1* | 1/2018 | He | H04W 4/06 |
| | | | | 370/312 |
| 2018/0054693 | A1* | 2/2018 | Agiwal | H04W 76/14 |
| 2018/0317172 | A1* | 11/2018 | Lepp | H04W 52/0235 |
| 2019/0239112 | A1* | 8/2019 | Rao | H04W 72/20 |
| 2020/0267691 | A1* | 8/2020 | Maeder | H04W 76/40 |
| 2021/0219320 | A1* | 7/2021 | Belleschi | H04W 76/14 |
| 2021/0344454 | A1* | 11/2021 | Lee | H04L 1/1692 |
| 2021/0400604 | A1* | 12/2021 | Wang | H04W 52/367 |
| 2022/0039138 | A1* | 2/2022 | Takeda | H04W 72/23 |
| 2022/0132278 | A1* | 4/2022 | Lee | H04W 4/44 |

OTHER PUBLICATIONS

Samsung, "Considerations on Sidelink Power Control", R1-1902286, 3GPP TSG RAN WG1 #96, Athens, Greece, Feb. 25-Mar. 1, 2019, see pp. 1-7.

Itl, "V2X UE behaviour upon releasing a unicast/groupcast session", R2-1902113, 3GPP TSG-RAN WG2 Meeting 105, Athens, Greece, Feb. 25-Mar. 1, 2019, see sections 1-3.

Huawei et al., "Discussion on channel mapping for NR SL", R2-1902035, 3GPP TSG-RAN WG2 Meeting 105, Athens, Greece, Feb. 25-Mar. 1, 2019, see sections 1-3.

* cited by examiner (a)

(b)

(a)

(b)

TRANSMISSION OF GROUPCAST SERVICE IN NR V2X

This application is the National Stage filing under 35 U.S.C. 371 of International Application No. PCT/KR2020/002646, filed on Feb. 24, 2020, which claims the benefit of Korean Patent Application No. 10-2019-0021435, filed on Feb. 22, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide a method for communication between apparatuses (or terminals) based on V2X communication, and the apparatuses (or terminals) performing the method.

Another technical problem of the present disclosure is to provide a method for performing groupcast communication between apparatuses based on V2X communication in a wireless communication system and an apparatus for performing the same.

The other technical problem of the present disclosure is to provide a method for transmitting a groupcast service based on linkage information indicating a relationship between a plurality of unicast services and a groupcast service, and an apparatus for performing the same.

According to an embodiment of the present disclosure, a method for performing sidelink (SL) communication by a first apparatus may be provided. The method may include determining mapping information representing a mapping relationship between a plurality of unicast services and a groupcast service based on the plurality of unicast services received from a plurality of apparatuses and transmitting the groupcast service to a second apparatus and a third apparatus included in the plurality of apparatuses based on the mapping information.

According to an embodiment of the present disclosure, a first apparatus performing SL communication may be provided. The first apparatus may include at least one memory storing instructions, at least one transceiver and at least one processor connecting the at least one memory and the at least one transceiver, wherein the at least one processor is configured to: determine mapping information representing a mapping relationship between a plurality of unicast services and a groupcast service based on the plurality of unicast services received from a plurality of apparatuses, and control the at least one transceiver to transmit the groupcast service to a second apparatus and a third apparatus included in the plurality of apparatuses based on the mapping information.

According to an embodiment of the present disclosure, an apparatus (or chip(set)) controlling a first terminal may be provided. The apparatus includes at least one processor and at least one computer memory operably coupled by the at least one processor and storing instructions, wherein, by the at least one processor executing the instructions, the first terminal is configured to: determine mapping information representing a mapping relationship between a plurality of unicast services and a groupcast service based on the plurality of unicast services received from a plurality of apparatuses, and transmit the groupcast service to a second apparatus and a third apparatus included in the plurality of apparatuses based on the mapping information.

According to an embodiment of the present disclosure, a non-transitory computer-readable storage medium having instructions stored thereon may be provided. Based on the instructions being executed by at least one processor: mapping information representing a mapping relationship between a plurality of unicast services and a groupcast service is determined by a first apparatus based on the plurality of unicast services received from a plurality of apparatuses, and the groupcast service is transmitted by the first apparatus to a second apparatus and a third apparatus included in the plurality of apparatuses based on the mapping information According to an embodiment of the present disclosure, a method for performing SL communication by a second apparatus may be provided. The method may include transmitting a unicast service related to a unicast connection between a first apparatus and the second apparatus to the first apparatus, receiving, from the first apparatus, mapping information determined by the first apparatus based on a plurality of unicast services received by the first apparatus from a plurality of apparatuses and receiving the groupcast service based on the mapping information from the first apparatus, wherein the plurality of apparatuses includes the second apparatus, wherein the plurality of unicast services include the unicast service, and wherein the mapping information represents a mapping relationship between the plurality of unicast services and the groupcast service.

According to an embodiment of the present disclosure, a second apparatus performing SL communication may be provided. The second apparatus includes at least one memory storing instructions, at least one transceiver and at least one processor connecting the at least one memory and the at least one transceiver, wherein the at least one processor is configured to: control the at least one transceiver to transmit a unicast service related to a unicast connection between a first apparatus and the second apparatus to the first apparatus, control the at least one transceiver to receive, from the first apparatus, mapping information determined by the first apparatus based on a plurality of unicast services received by the first apparatus from a plurality of apparatuses, and control the at least one transceiver to receive the groupcast service based on the mapping information from the first apparatus, wherein the plurality of apparatuses includes the second apparatus, wherein the plurality of unicast services include the unicast service, and wherein the mapping information represents a mapping relationship between the plurality of unicast services and the groupcast service.

According to the present disclosure, a terminal (or an apparatus) may perform SL communication effectively.

According to the present disclosure, V2X communication between apparatuses (or terminals) may be performed effectively.

According to the present disclosure, apparatuses based on V2X communication in a wireless communication system may efficiently transmit and receive sidelink control information mutually.

According to the present disclosure, by performing groupcast communication based on an already established unicast connection (e.g., PC5-RRC connection), a procedure for establishing a group-specific PC5-RRC connection may be omitted. By omitting the establishment procedure, it is possible to reduce the groupcast-related complexity of the apparatus (or terminal).

DESCRIPTION OF EXEMPLARY EMBODIMENTS

Figure 1:
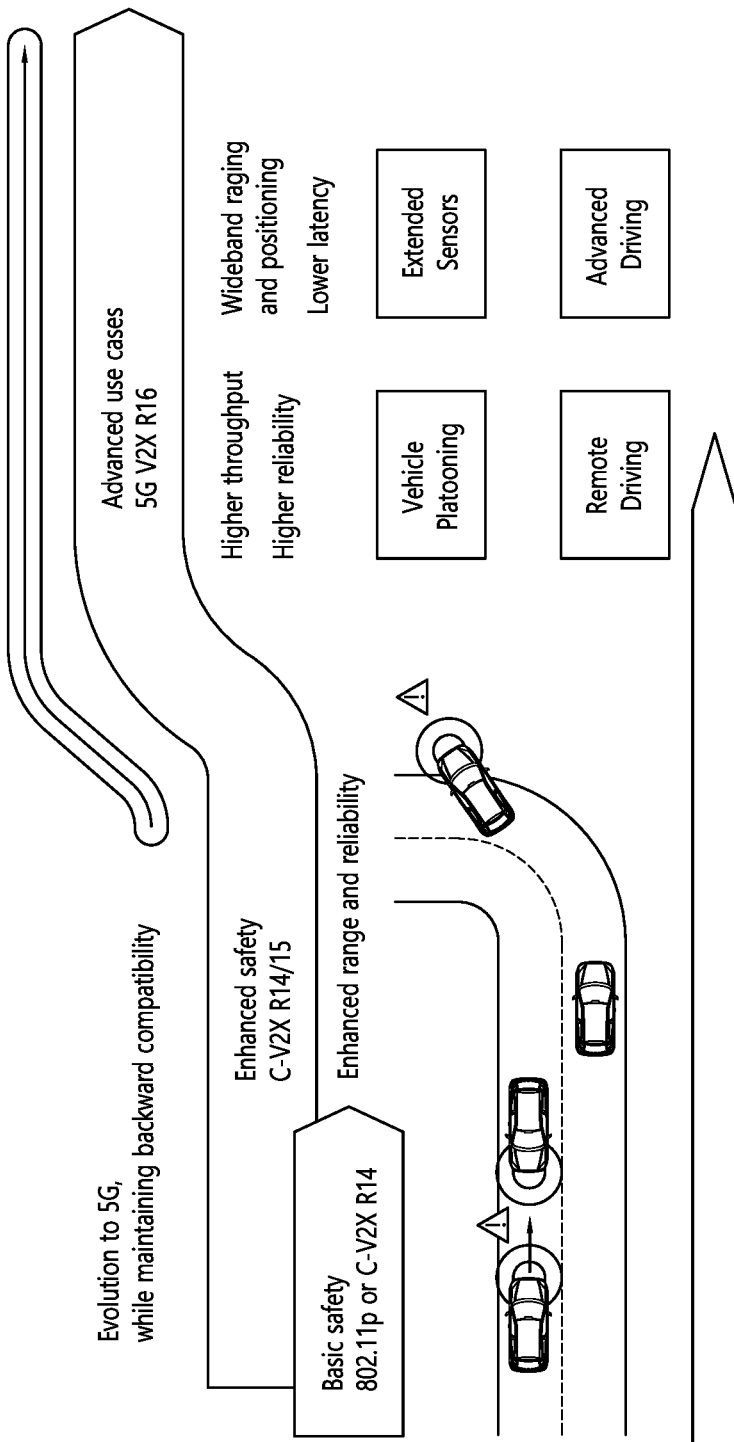
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
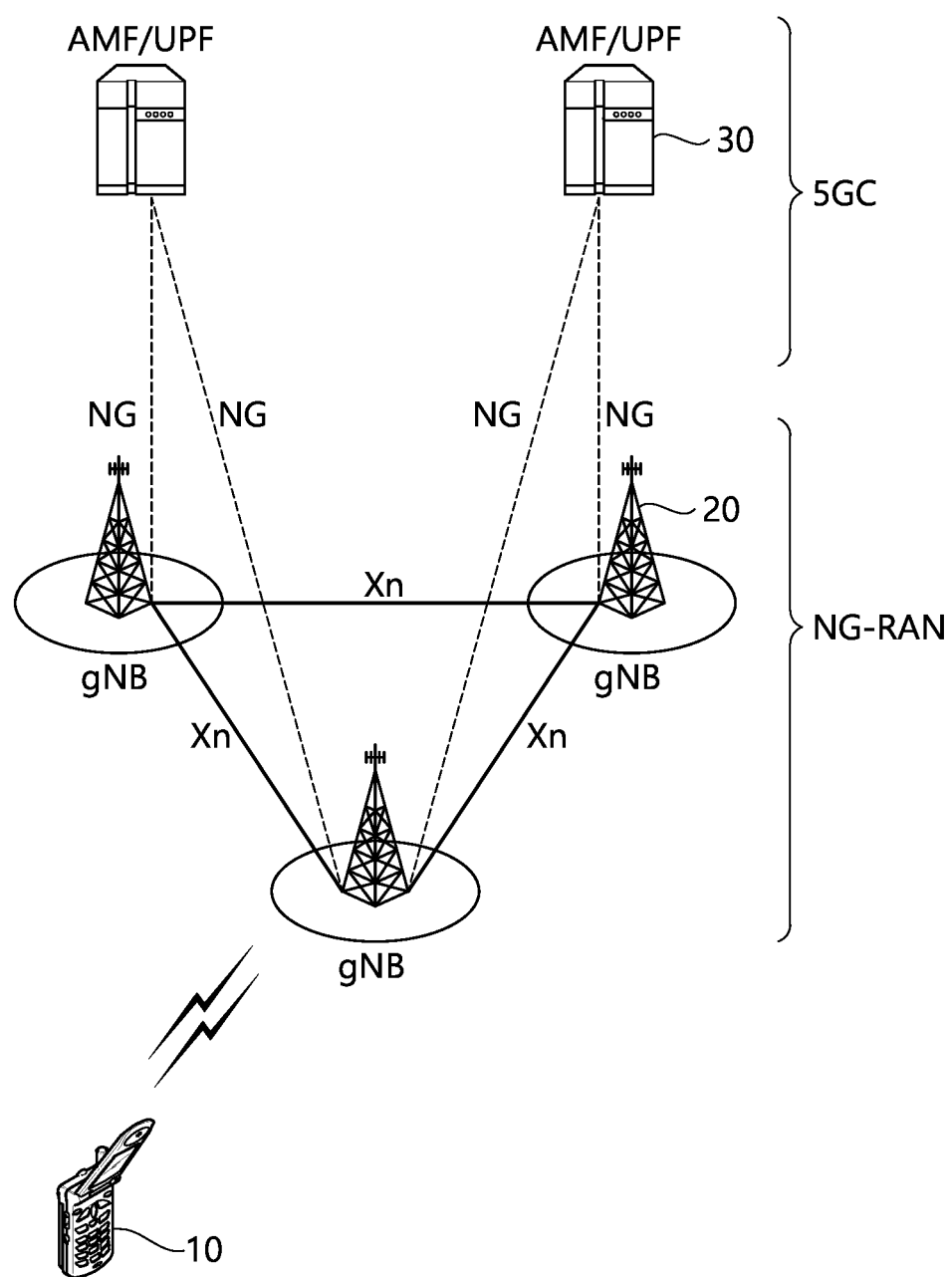
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
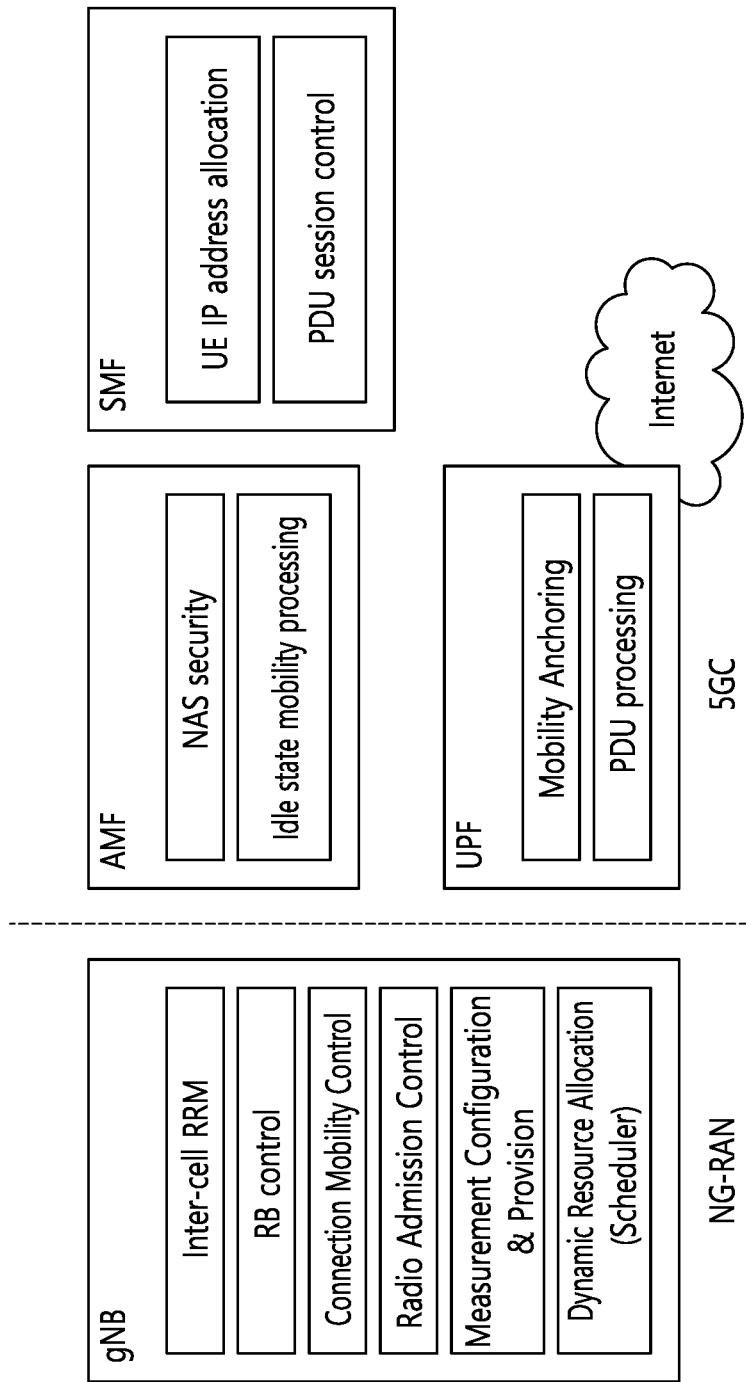
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
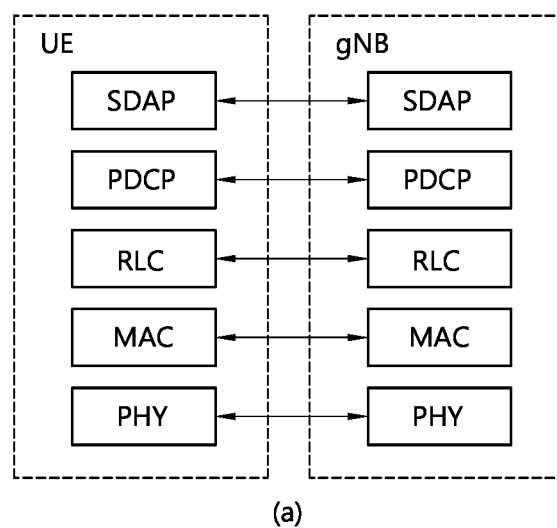
FIG. 4 shows a radio protocol architecture, in accordance with an embodiment of the present disclosure.
Figure 4:
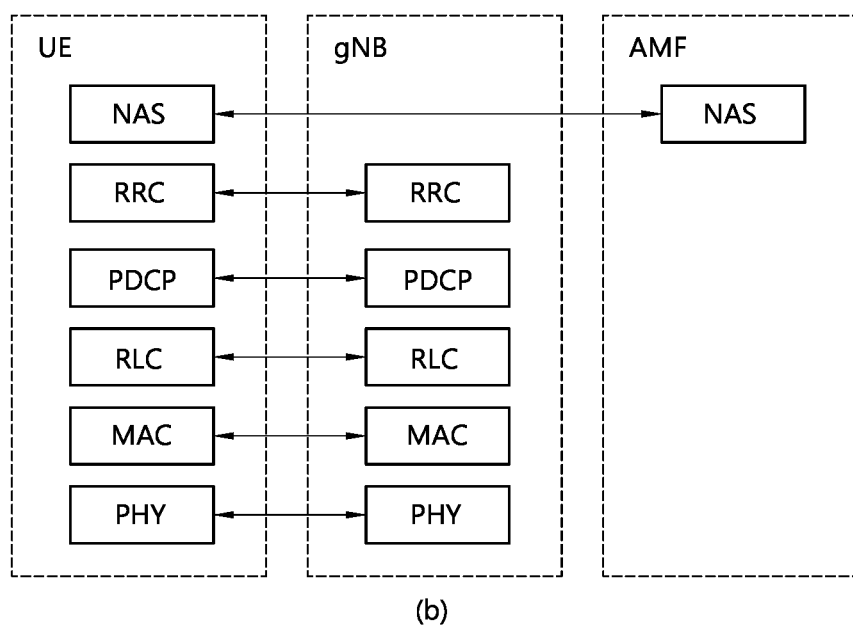

FIG. 4 shows a radio protocol architecture, in accordance with an embodiment of the present disclosure. The embodiment of FIG. 4 may be combined with various embodiments of the present disclosure. Specifically, (a) of FIG. 4 shows a radio protocol architecture for a user plane, and (b) of FIG. 4 shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel A transmission time interval (TTI) is a unit time of subframe transmission.

Figure 5:
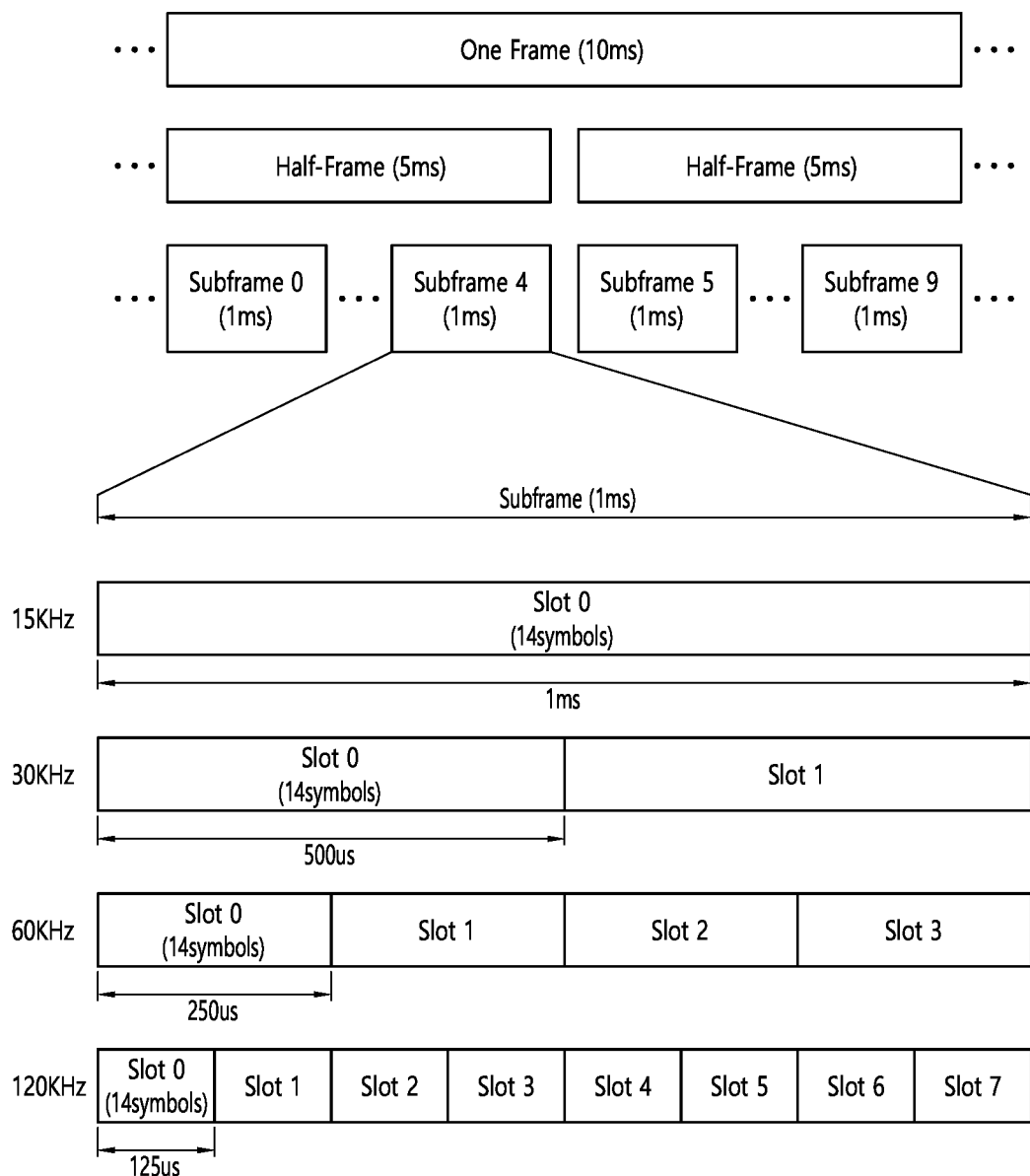
FIG. 5 shows a structure of a wireless frame of an NR, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
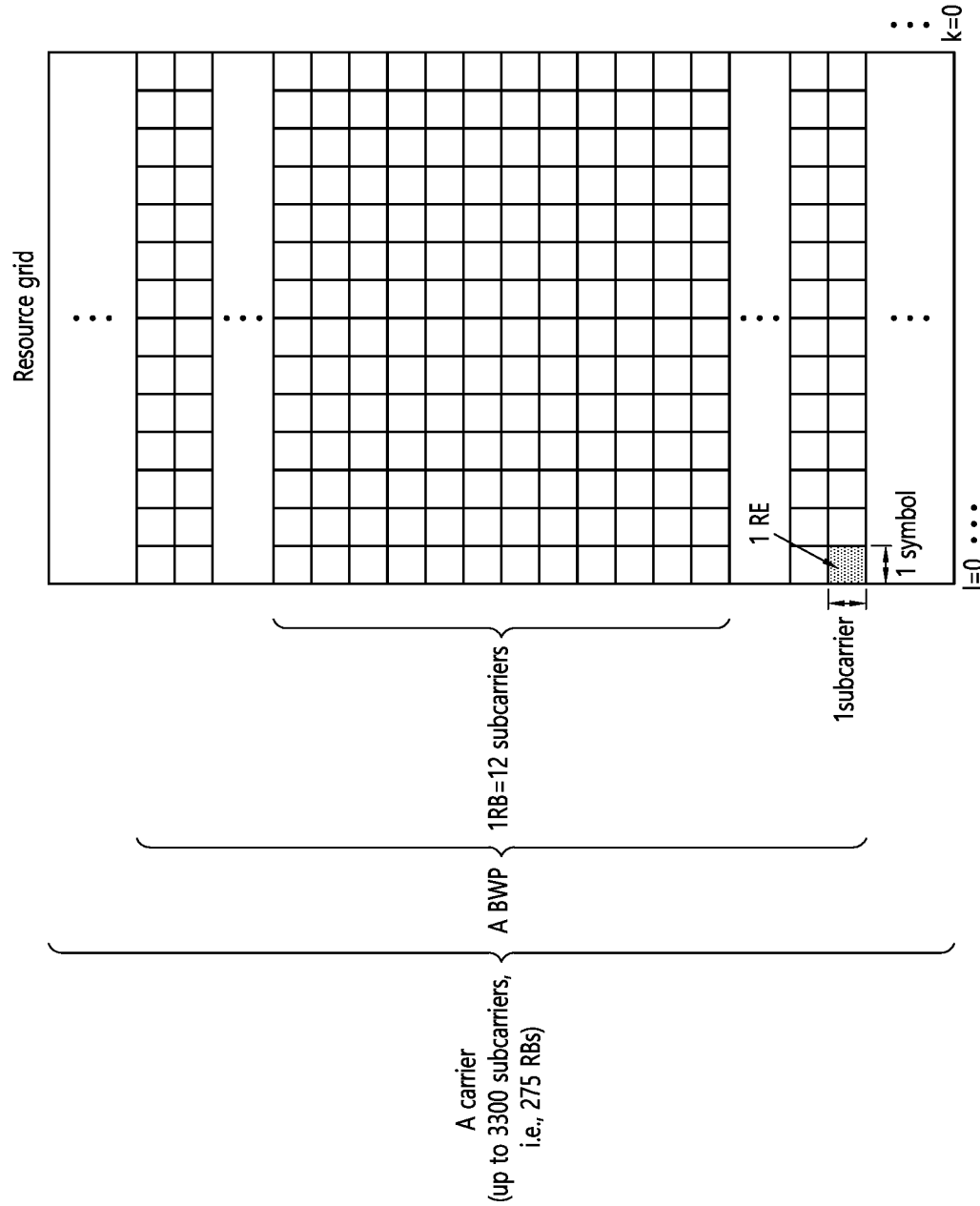
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
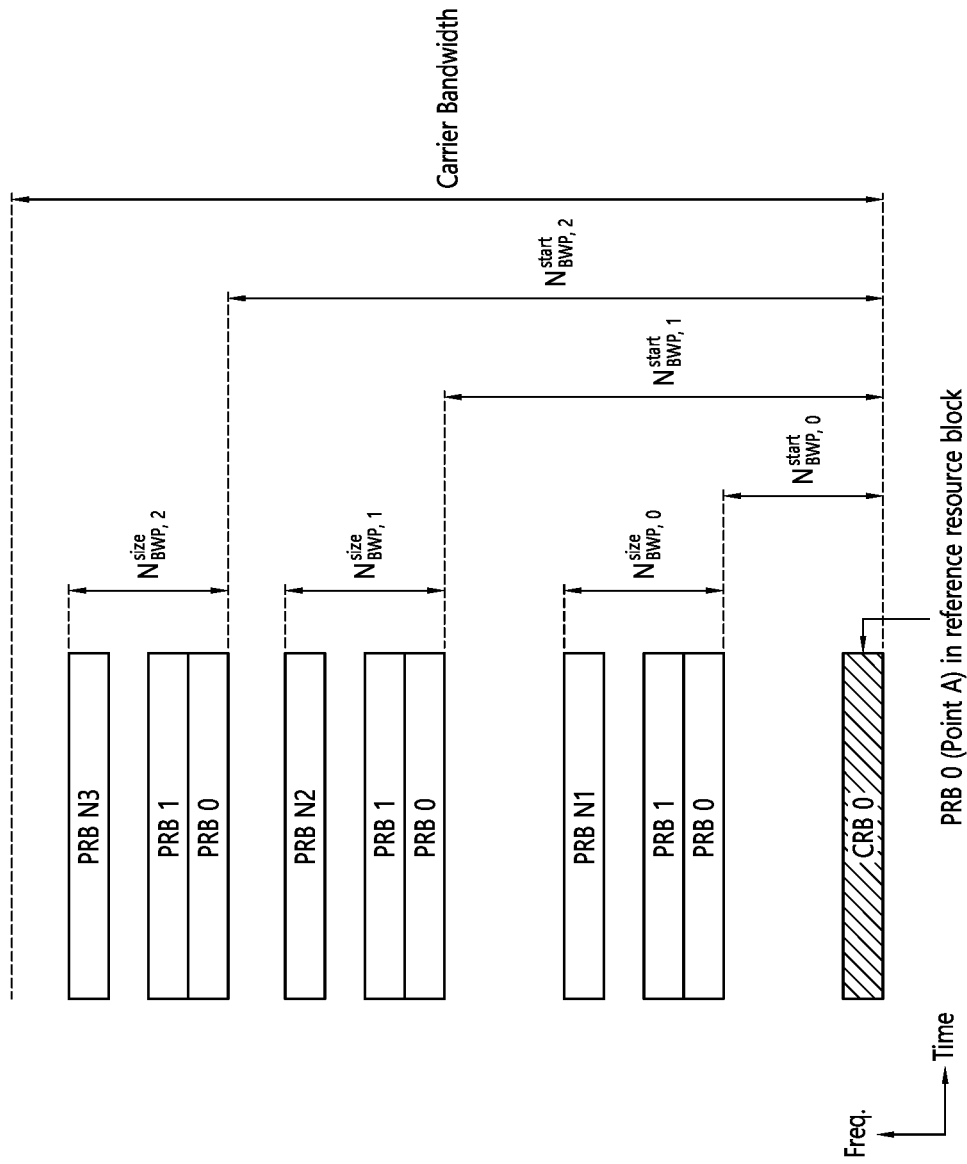
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
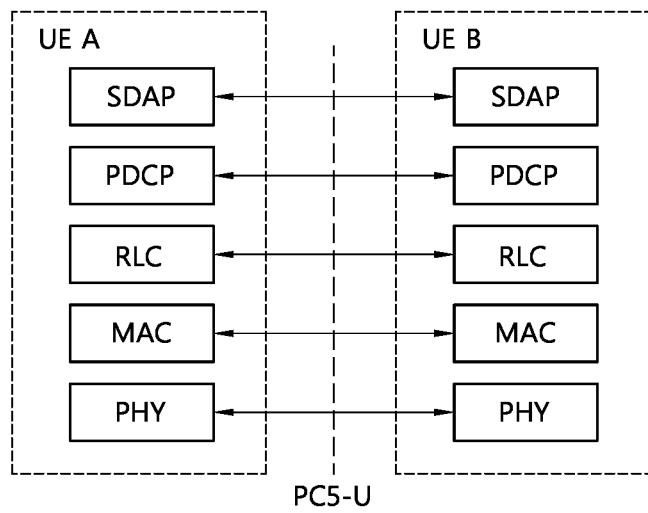
FIG. 8 shows a radio protocol architecture for a SL communication, in accordance with an embodiment of the present disclosure.
Figure 8:
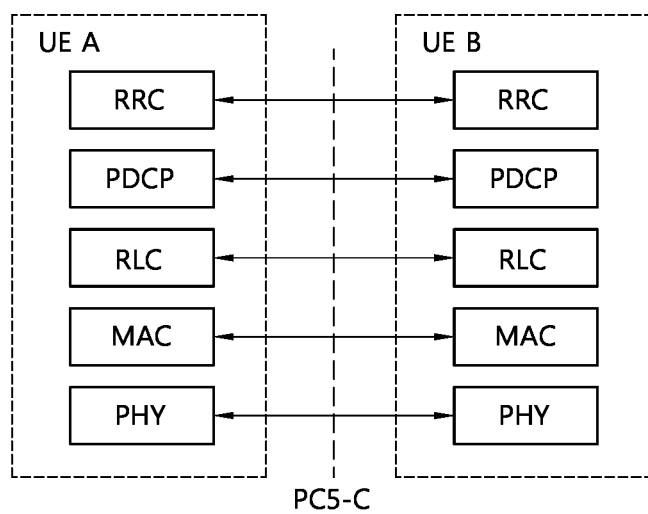

FIG. 8 shows a radio protocol architecture for a SL communication, in accordance with an embodiment of the present disclosure. The embodiment of FIG. 8 may be combined with various embodiments of the present disclosure. More specifically, (a) of FIG. 8 shows a user plane protocol stack, and (b) of FIG. 8 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
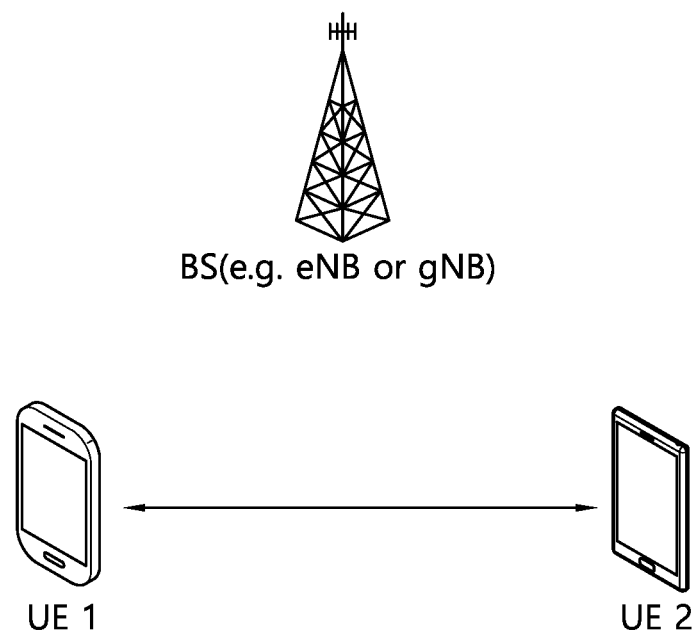
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
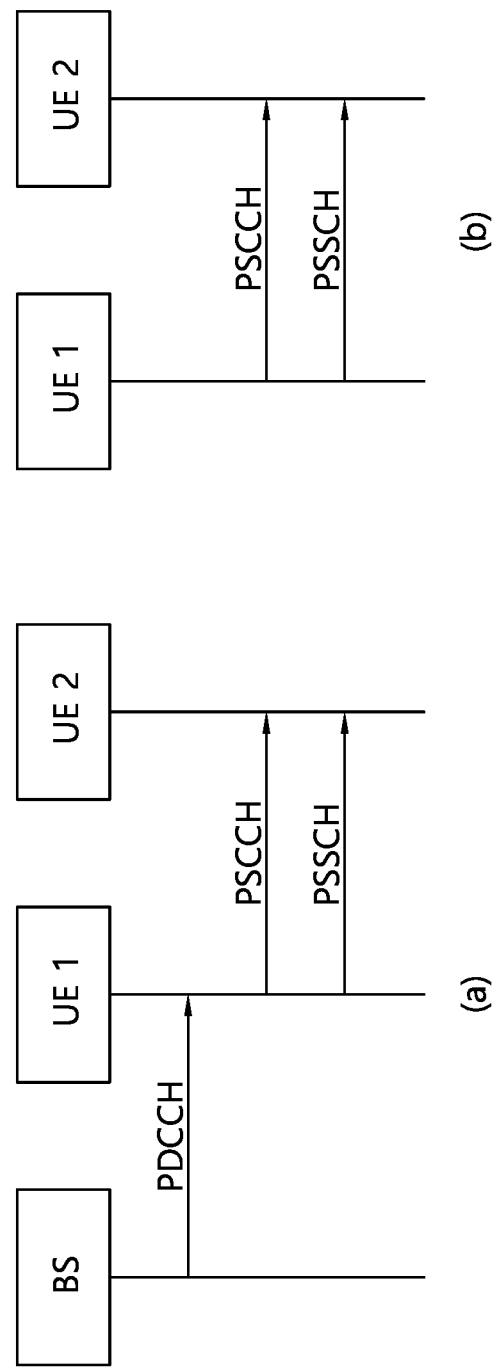
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 10 shows a UE operation related to an LTE transmission mode 1 or an LTE transmission mode 3. Alternatively, for example, (a) of FIG. 10 shows a UE operation related to an NR resource allocation mode 1. For example, the LTE transmission mode 1 may be applied to general SL communication, and the LTE transmission mode 3 may be applied to V2X communication.

For example, (b) of FIG. 10 shows a UE operation related to an LTE transmission mode 2 or an LTE transmission mode 4. Alternatively, for example, (b) of FIG. 10 shows a UE operation related to an NR resource allocation mode 2.

Referring to (a) of FIG. 10, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 10, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
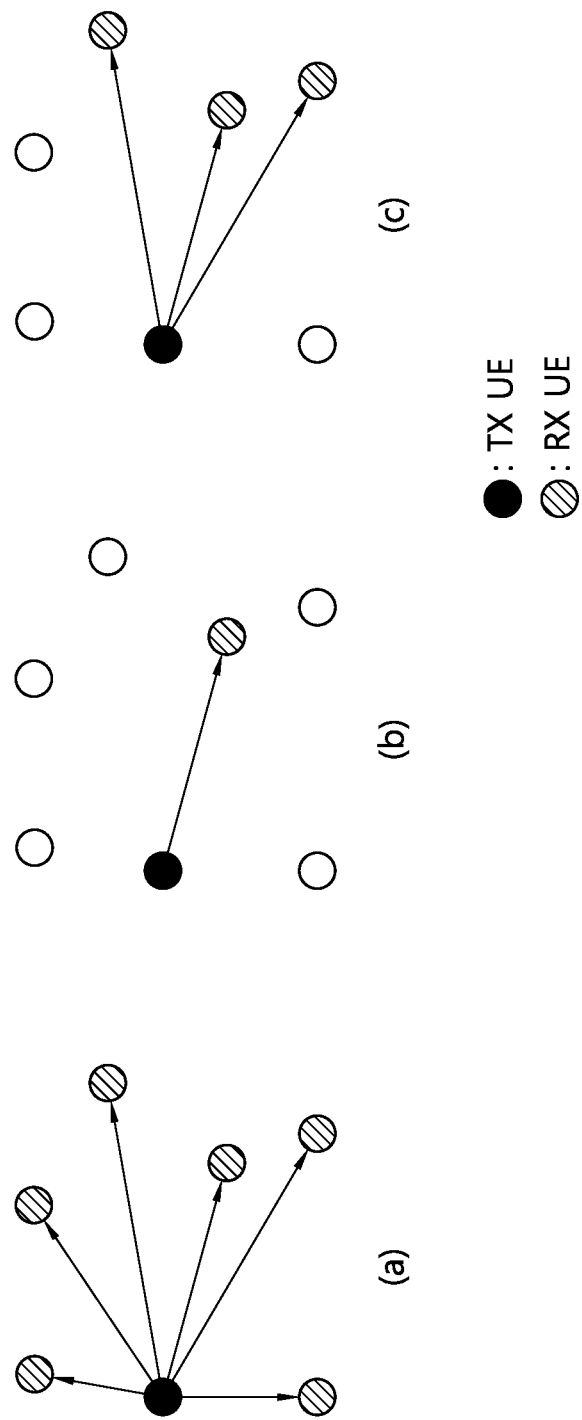
FIG. 11 shows three cast types, in accordance with an embodiment of the present disclosure.

FIG. 11 show three cast types, in accordance with an embodiment of the present disclosure. The embodiment of FIG. 11 may be combined with various embodiments of the present disclosure. Specifically, (a) of FIG. 11 shows broadcast-type SL communication, (b) of FIG. 11 shows unicast type-SL communication, and (c) of FIG. 11 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

On the other hand, when a unicast connection (eg, PC5 RRC connection) is established between the terminals (or apparatuses) participating in the groupcast, the terminals may perform an access stratum (AS) level link management (e.g., RLM and/or RRM, etc) by exchanging PC5 RRC messages with each other. Accordingly, the terminals may operate to efficiently satisfy service-related requirements based on the tight control described above. However, for this purpose, it may be undesirable in terms of implementation/complexity of the terminal to newly introduce a group-specific PC5 RRC connection establishment procedure/definition. Therefore, based on the already established PC5 RRC connection, there is a need to propose a method for the terminal to perform groupcast. Hereinafter, a method for a terminal to perform groupcast and an apparatus supporting the same according to an embodiment of the present disclosure will be described.

In the present disclosure, "terminal" may be replaced with an apparatus, a UE, a vehicle terminal, and the like.

Throughout the present disclosure, a "transmitting terminal" refers to a terminal that transmits a groupcast service to target terminals. In the present disclosure, a transmitting terminal may be replaced with various terms such as a first apparatus, a transmitting UE, a transmitting apparatus, and the like.

Throughout the present disclosure, "receiving terminal" refers to a terminal receiving a unicast service or a groupcast service from a transmitting terminal. In the present disclosure, a receiving terminal may be replaced with various terms such as a receiving UE, a receiving apparatus, and the like.

Throughout the present disclosure, "target terminal" refers to a terminal receiving a groupcast service from the transmitting terminal among the receiving terminals. That is, the target terminal may indicate a terminal that is a target of the groupcast service by the transmitting terminal. In an embodiment, transmission of the groupcast service by the transmitting terminal may be based on a unicast service between some of the receiving terminals and the transmitting terminal. In the present disclosure, the target terminal may be replaced with various terms such as a second apparatus, a third apparatus, a target UE, a target apparatus, and the like.

Figure 12:
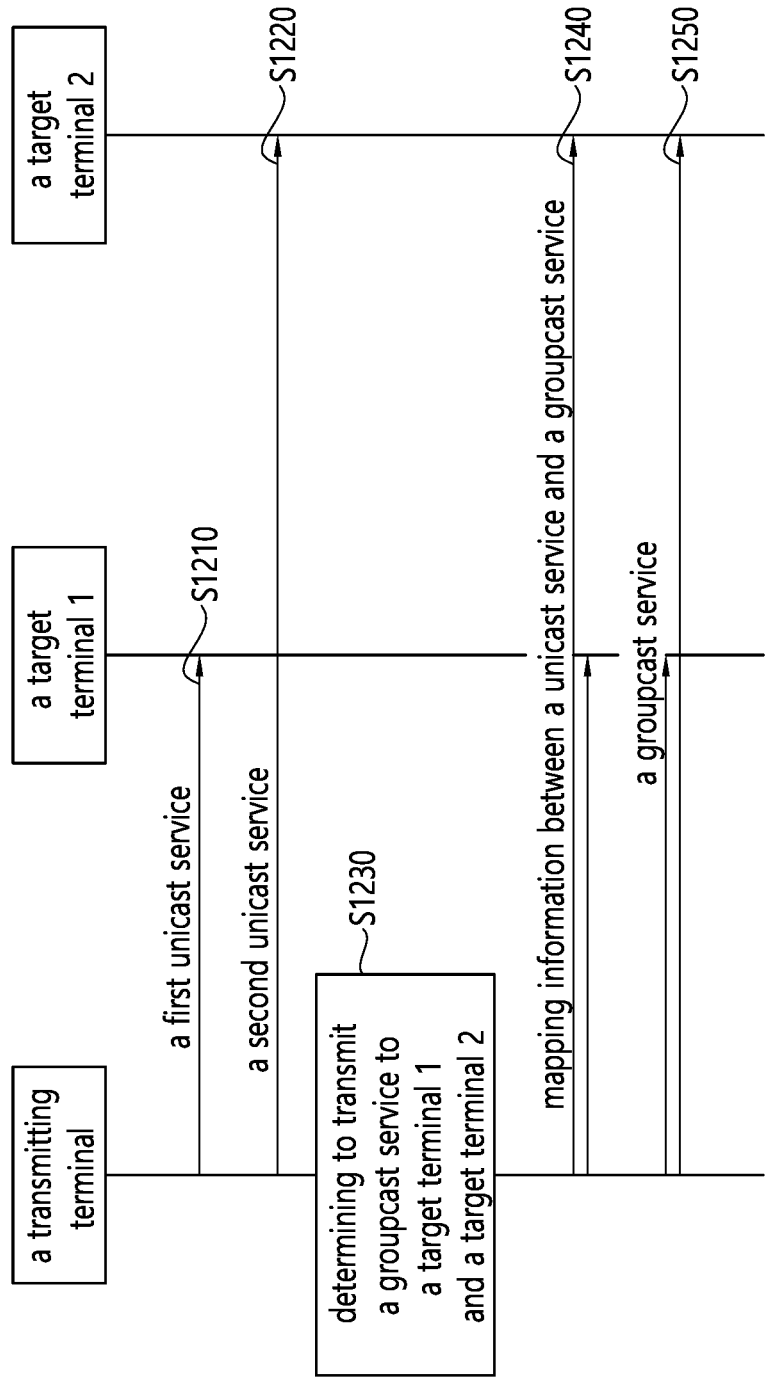
FIG. 12 shows a procedure for a transmitting terminal to perform a groupcast based on a PC5 RRC connection according to an embodiment of the present disclosure.

FIG. 12 shows a procedure for a transmitting terminal to perform a groupcast based on a PC5 RRC connection according to an embodiment of the present disclosure.

Referring to FIG. 12, a unicast connection (first unicast connection) is established between the transmitting terminal and the target terminal 1, and a unicast connection (second unicast connection) is established between the transmitting terminal and the target terminal 2. Accordingly, it is possible for the transmitting terminal to perform unicast communication with the target terminal 1 and the target terminal 2. In one example, the unicast connection may be a PC5 RRC connection.

Referring to FIG. 12, in step S1210, the transmitting terminal may transmit a first unicast service to target terminal 1, and in step S1220, the transmitting terminal may transmit a second unicast service to target terminal 2. Furthermore, the transmitting terminal may obtain link (quality) information for the target terminal 1, and the transmitting terminal may obtain link (quality) information for the target terminal 2.

In step S1230, the transmitting terminal may decide to provide a groupcast service to a plurality of terminals. For example, the plurality of terminals may be some terminals among terminals in which a transmitting terminal performs unicast communication (or transmits a unicast service) through a unicast connection. In an embodiment according to FIG. 12, the transmitting terminal may decide to transmit the groupcast service to the target terminal 1 and the target terminal 2.

In one embodiment, the transmitting terminal may obtain mapping information representing a mapping relationship between the plurality of unicast services and the groupcast service based on the plurality of unicast services received from the plurality of terminals. The transmitting terminal may decide to transmit the groupcast service to the target terminal 1 and the target terminal 2 based on the mapping information.

In step S1240, the transmitting terminal may transmit mapping information (or linkage information) between the unicast service and the groupcast service to the target terminal 1 and the target terminal 2. In one example, the mapping information may be a mapping table indicating a mapping relationship between a unicast service and a groupcast service. In another example, the mapping information may be information indicating a plurality of unicast services related to a groupcast service (eg, a unicast service ID). Meanwhile, step S1240 is not an essential operation of the transmitting terminal, and may be omitted in some cases.

In an embodiment, the mapping information between the unicast service and the groupcast service may be configured by the transmitting terminal. For example, the transmitting terminal may determine which terminals to perform groupcast to among terminals having a unicast connection (e.g., unicast PC5 RRC connection), and for this, the transmitting terminal may adaptively change and/or configure mapping information between the unicast service and the groupcast service.

In one example, when an out-of-coverage terminal exists among target terminals receiving the groupcast service, mapping information between the unicast service and the groupcast service may be preconfigured by the base station or the network. In another example, in the case of an IN-COVERAGE terminal among target terminals receiving the groupcast service, mapping information between the unicast service and the groupcast service may be configured by the base station or the network. In the other example, when the mapping information configured by the terminal collides with the mapping information (pre) configured by the base station or the network, the terminal may preferentially apply the mapping information configured by the terminal.

In an embodiment, the mapping information between the unicast service and the groupcast service may be signaled from an upper layer to a lower layer. In one example, the upper layer may be a V2X layer or an application layer, and the lower layer may be an AS layer. The AS layer may include at least one of an RRC layer, a PDCP layer, an RLC layer, a MAC layer, and a PHY layer.

In one example, the mapping information may be mapping information between a unicast destination ID and a groupcast destination ID. In another example, the mapping information may be mapping information between a unicast source ID and a groupcast source ID. In the other example, the mapping information may be mapping information between a unicast destination ID and a groupcast source ID. In the other example, the mapping information may be mapping information between a unicast source ID and a groupcast destination ID.

In one example, the mapping relationship between the unicast service and the groupcast service may be configured differently for each groupcast service. In another example, the mapping relationship between the unicast service and the groupcast service may be configured differently for each groupcast group.

In one example, to multiplex a plurality of service packets into one MAC PDU, and to alleviate the problem of establishing an independent PC5 RRC connection for each service with respect to a link used by the same transmitting terminal and receiving terminal, a plurality of destination IDs and/or source IDs may be expressed as one representative ID. Specifically, for example, a plurality of service specific destination IDs and/or source IDs may be expressed as one representative ID to multiplex a plurality of service packets to a MAP PDU in unicast, and to alleviate the problem of establishing an independent PC5 RRC connection for each service on a link used by the same transmitting terminal and receiving terminal. Here, the representative ID may be independently defined for a source and/or a destination. Alternatively, the representative ID may be defined as one without distinction for a source and/or a destination. For example, the representative ID may be signaled through a field independent of a destination ID field and/or a source ID field on sidelink control information (SCI). Alternatively, for example, the representative ID may be signaled through some bits of a destination ID field and/or a source ID field on the SCI. In this case, the destination ID and/or the source ID may be interpreted as being hashed with the representative ID. For example, the some bits may be a Most Significant Bit (MSB) or a Least Significant Bit (LSB). For example, the some bits may be some predefined bits other than the MSB and the LSB. Or, for example, the representative ID may be signaled through a destination ID and/or a source ID on the SCI.

In one example, when the representative ID is applied to an embodiment of the present disclosure, the mapping information may be mapping information between a unicast destination representative ID and a groupcast destination representative ID. In another example, when the representative ID is applied to an embodiment of the present disclosure, the mapping information may be mapping information between a unicast source representative ID and a groupcast source representative ID. In another example, when the representative ID is applied to an embodiment of the present disclosure, the mapping information may be mapping information between a unicast destination representative ID and a groupcast source representative ID. In another example, when the representative ID is applied to an embodiment of the present disclosure, the mapping information may be mapping information between a unicast source representative ID and a groupcast destination (representative) ID.

In step S1250, the transmitting terminal may transmit the groupcast service to a plurality of target terminals (target terminal 1 and target terminal 2 in the case of an embodiment according to FIG. 12). For example, the groupcast service may be a groupcast packet, groupcast data, or a groupcast message. For example, the groupcast service may be transmitted with a specific groupcast destination ID and/or a specific groupcast source ID, and the specific groupcast destination ID and/or the specific groupcast source ID may be mapped with a plurality of unicast destination IDs and/or a plurality of unicast source IDs. Accordingly, the groupcast service may be transmitted by targeting a plurality of receiving terminals associated with a plurality of unicast destination IDs and/or a plurality of unicast source IDs.

For example, when the transmitting terminal transmits a groupcast service, the transmitting terminal may use link information between the transmitting terminal and the target terminal. That is, when the transmitting terminal transmits the groupcast service, the transmitting terminal may use (link quality related) link information (or quality information) obtained from each of the target terminals (e.g., target terminal 1 and target terminal 2). For example, the information may be obtained through a unicast PC5 RRC connection between the transmitting terminal and each target terminal. For example, the link information (or quality information) may include at least one of pathloss between the transmitting terminal and the target terminal, RSRP, RSRQ, and CSI (Channel State Information).

Specifically, for example, the transmitting terminal transmitting the groupcast service may configure/control the transmission power of the groupcast service based on a maximum value among obtained pathloss between the transmitting terminal and the target receiving terminal. Or, for example, the transmitting terminal transmitting the groupcast service may determine the groupcast service related transmission parameter based on a minimum value among obtained RSRP, RSRQ, and/or CQI (Channel Quality Indicator) between the transmitting terminal and the target receiving terminal. For example, the groupcast service-related transmission parameter may be related to a Modulation Coding Scheme (MCS), an amount of resources, whether to retransmit, and the like.

If the mapping relationship between the unicast service and the groupcast service becomes unclear, the transmitting terminal may not use link (quality) information obtained through a unicast PC5 RRC connection or the like. In this case, the transmitting terminal may fall back to a predefined operation. For example, the transmitting terminal may transmit the groupcast service based on group-specifically configured maximum power, minimum MCS, maximum number of retransmissions, resource amount for groupcast service transmission, and the like. For example, when the target receiving terminal is out of a communication range of the transmitting terminal, the mapping relationship between the unicast service and the groupcast service may become unclear. For example, when the accuracy of sidelink measurement between the transmitting terminal and the target receiving terminal falls below a predefined threshold, the mapping relationship between the unicast service and the groupcast service may become unclear. For example, when Qout of a link is declared because the hypothetical error rate of a control channel calculated by RS predefined in RLM becomes smaller than a predefined threshold, a mapping relationship between the unicast service and the groupcast service may become unclear. For example, when the unicast link (eg, PC5 RRC connection) between the transmitting terminal and the target receiving terminal is released or unstable, the mapping relationship between the unicast service and the groupcast service may become unclear.

Also, according to an embodiment of the present disclosure, when the UE detects the RLF through the (AS level) RLM for the unicast link, the UE may be configured to stop the sidelink HARQ feedback for the groupcast. In addition, when RLF occurs in the unicast link, the terminal may estimate QoS for groupcast and inform the application layer of the estimated QoS. Alternatively, if the terminal may determine the link quality (between the transmitting terminal and the receiving terminal) based on RSRP, RSRQ, etc. for unicast, the terminal may estimate the QoS for the groupcast, and the terminal may inform the application layer of the estimated QoS. Upon receiving the corresponding information, the application layer may turn off the relevant application or update the QoS requirements.

Also, according to an embodiment of the present disclosure, the mapping information between the unicast service and the groupcast service may be exchanged/shared between terminals through predefined signaling. For example, the mapping information may be exchanged/shared through signaling based on PC5 RRC configured for unicast. The mapping information may be exchanged/shared between terminals having a PC5 RRC connection for unicast. Therefore, from the perspective of the first terminal, when a mapping relationship is established between the unicast source ID and the groupcast destination ID of the second terminal performing unicast, link (quality) information between the first terminal and the second terminal may be reused for groupcast communication by the second terminal. Furthermore, according to an embodiment of the present disclosure, when the transmitting terminal intends to perform groupcast on terminals that have already established a unicast connection, the transmitting terminal may reuse the unicast connection. Accordingly, the transmitting terminal may perform an operation such as groupcast (AS level) link management.

Hereinafter, embodiments of the present disclosure will be described in more detail with reference to FIGS. 13 and 14.

Figure 13:
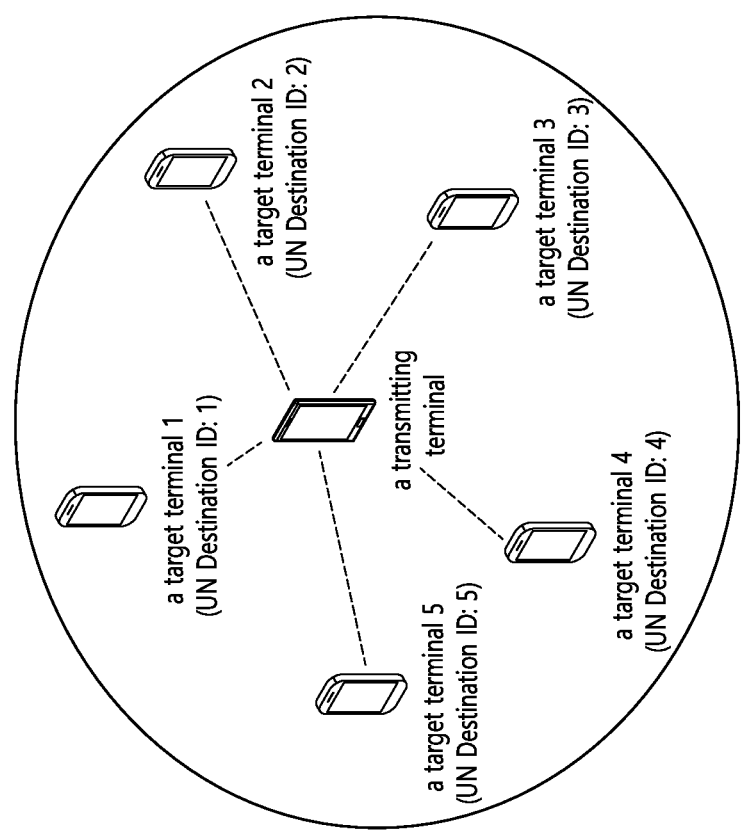
FIG. 13 is a diagram for describing a process in which a transmitting terminal transmits a groupcast service based on a relationship between a unicast service and a groupcast service according to an embodiment of the present disclosure.

FIG. 13 is a diagram for describing a process in which a transmitting terminal transmits a groupcast service based on a relationship between a unicast service and a groupcast service according to an embodiment of the present disclosure.

Referring to FIG. 13, it is assumed that the transmitting terminal establishes a PC5 RRC connection with the target terminal 1 to the target terminal 5. In addition, it is assumed that the transmitting terminal transmits a unicast service related to the unicast destination ID 1 to the target terminal 1, transmits a unicast service related to the unicast destination ID 2 to the target terminal 2, transmits a unicast service related to the unicast destination ID 3 to the target terminal 3, transmits a unicast service related to the unicast destination ID 4 to the target terminal 4, and transmits a unicast service related to the unicast destination ID 5 to the target terminal 5. In an embodiment of FIG. 13, for convenience of description, it is assumed that a groupcast destination ID and a plurality of unicast destination IDs are mapped, but the technical spirit of the present disclosure is not limited thereto. For example, a plurality of unicast source IDs and groupcast source IDs may be mapped, a plurality of unicast destination IDs and groupcast source IDs may be mapped, and a plurality of unicast source IDs and groupcast destination IDs may be mapped.

In one example, when the transmitting terminal determines to transmit the groupcast service to the target terminal 1 and the target terminal 2, the transmitting terminal may transmit the mapping information to the target terminal 1 and the target terminal 2. The groupcast service to be transmitted to the target terminal 1 and the target terminal 2 may be related to the destination ID A. In this case, link information between the transmitting terminal and the target terminals 1 and 2 may be considered for transmission of the groupcast service related to the destination ID A. For example, when the transmitting terminal have determined to transmit the groupcast service to the target terminal 1, the target terminal 4, and the target terminal 5, the transmitting terminal may transmit the mapping information to the target terminal 1, the target terminal 4, and the target terminal 5. The groupcast service to be transmitted to the target terminal 1, the target terminal 4, and the target terminal 5 may be related to the destination ID C. In this case, at least one of link information between the transmitting terminal and the target terminal 1, 4, or 5 may be considered for transmission of the groupcast service related to the destination ID C.

For example, when the transmitting terminal transmits a groupcast service related to destination ID A, the transmitting terminal may compare a path loss value between itself and target terminal 1 and a path loss value between itself and target terminal 2. In addition, the transmitting terminal may configure and/or control the transmission power of the groupcast service related to the destination ID A based on the maximum value among the two path losses. Alternatively, for example, the transmitting terminal may compare the RSRQ for the target terminal 1 and the RSRQ for the target terminal 2. In addition, the transmitting terminal may determine a transmission parameter for the groupcast service related to the destination ID A based on the minimum RSRQ value. For example, the transmission parameter may be a Modulation Coding Scheme (MCS), an amount of resources, whether to retransmit, and the like.

Figure 14:
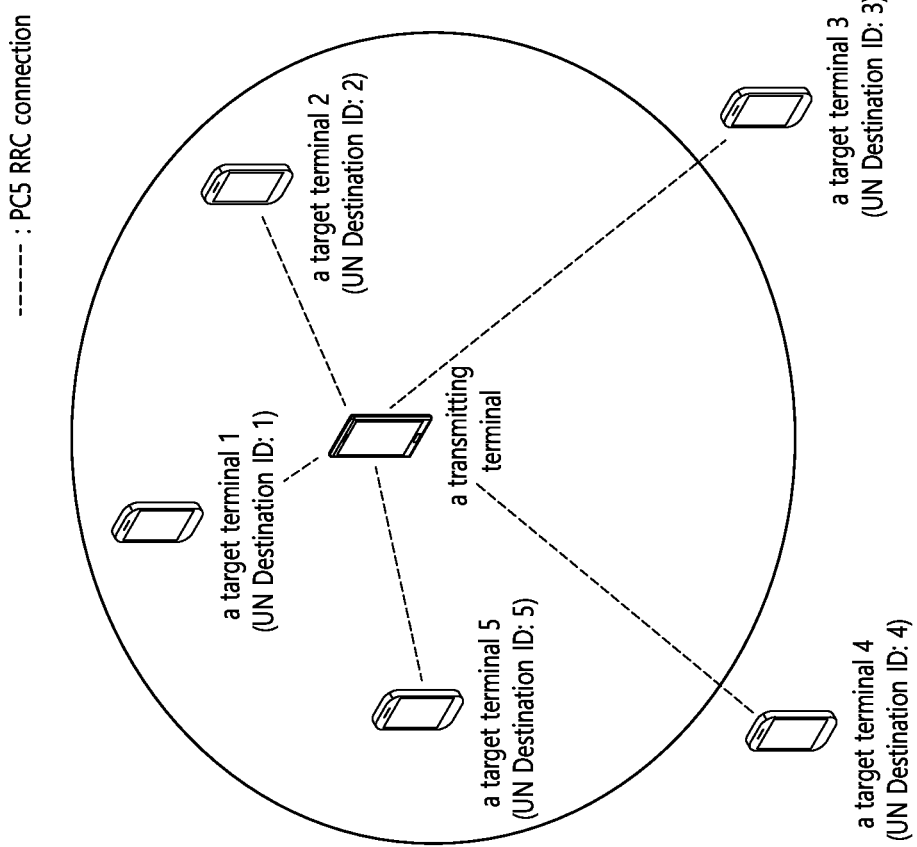
FIG. 14 is a diagram for describing a process in which a transmitting terminal transmits a groupcast service based on a relationship between a unicast service and a groupcast service according to another embodiment of the present disclosure.

FIG. 14 is a diagram for describing a process in which a transmitting terminal transmits a groupcast service based on a relationship between a unicast service and a groupcast service according to another embodiment of the present disclosure.

Referring to FIG. 14, it is assumed that the target terminal 3 and the target terminal 4 are out of communication range of the transmitting terminal. Accordingly, the mapping relationship between the unicast service and the groupcast service may become unclear. In this case, the transmitting terminal may not use link information obtained through a unicast PC5 RRC connection or the like.

For example, in the table of FIG. 14, when the transmitting terminal intends to transmit a groupcast service related to groupcast destination ID B, C, or D, the transmitting terminal may not use link information obtained through unicast PC5 RRC connection, etc. In this case, the transmitting terminal may fall back to a predefined operation. For example, when the transmitting terminal intends to transmit a groupcast service related to groupcast destination ID D, the transmitting terminal may transmit the groupcast service based on the maximum power, the minimum MCS, the maximum number of retransmissions, or the amount of resources group-specifically configured to transmit a groupcast service related to groupcast destination ID D.

On the other hand, for example, in the table of FIG. 14, when the transmitting terminal intends to transmit a groupcast service related to groupcast destination ID A, the transmitting terminal may use link information obtained through unicast PC5 RRC connection, etc. Since groupcast destination ID A is related to unicast destination IDs 1 and 2, in the case of a groupcast service related to groupcast destination ID A, the degree of relevance between the link information of the unicast service and the link information of the groupcast service is high.

Figure 15:
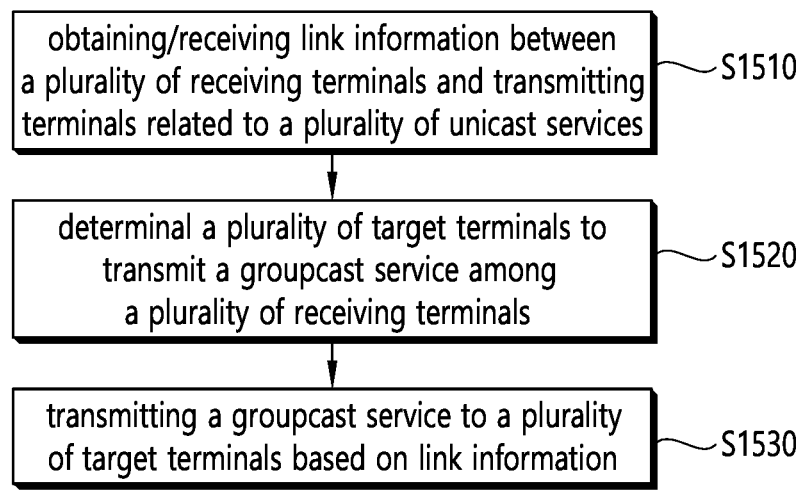
FIG. 15 is a flowchart illustrating an operation of a transmitting terminal according to an embodiment of the present disclosure.

FIG. 15 is a flowchart illustrating an operation of a transmitting terminal according to an embodiment of the present disclosure.

Referring to FIG. 15, in step S1510, a transmitting terminal may obtain/receive link information between a plurality of receiving terminals related to a plurality of unicast services and the transmitting terminal. The transmitting terminal may obtain/receive the link information with respect to the receiving terminal that has established a unicast connection with the transmitting terminal.

In step S1520, among the plurality of receiving terminals, the transmitting terminal may determine a plurality of target terminals to which the groupcast service is to be transmitted. In step S1530, based on the link information, the transmitting terminal may transmit the groupcast service to the plurality of target terminals.

The proposed method may be applied to the apparatus described below. For example, the first wireless device 100 of FIG. 21 may be a transmitting terminal, and the second wireless device 200 may be a receiving terminal. The transmitting terminal may include at least one or more processors such as processor 102, at least one memory such as memory 104, and at least one or more transceivers such as transceiver 106. In addition, the receiving terminal may include at least one or more processors such as the processor 202, at least one or more memories such as the memory 204, and at least one or more transceivers such as the transceiver 206. First, the processor 102 of the transmitting terminal may obtain link information between a plurality of receiving terminals related to a plurality of unicast services and the transmitting terminal. The transmitting terminal may obtain the link information with respect to the receiving terminal that has established a unicast connection with the transmitting terminal. And, among the plurality of receiving terminals, the processor 102 of the transmitting terminal may determine a plurality of target terminals to which the groupcast service is to be transmitted.

In one example, the processor 102 of the transmitting terminal may determine mapping information indicating a mapping relationship between the transmitting terminal and the plurality of target terminals. In a more specific example, the processor 102 of the transmitting terminal may determine the mapping information based on pre-configuration, configuration by the base station, or determination of the processor 102 itself. In another example, the mapping information may be determined and/or obtained based on a plurality of unicast services between the transmitting terminal and a plurality of receiving terminals.

In an embodiment, the processor 102 of the transmitting terminal may control the transceiver 106 of the transmitting terminal to transmit mapping information between the groupcast service and the plurality of unicast services to the plurality of target terminals. Based on the link information, the processor 102 of the transmitting terminal may control the transceiver 106 of the transmitting terminal to transmit the groupcast service to the plurality of target terminals.

Figure 16:
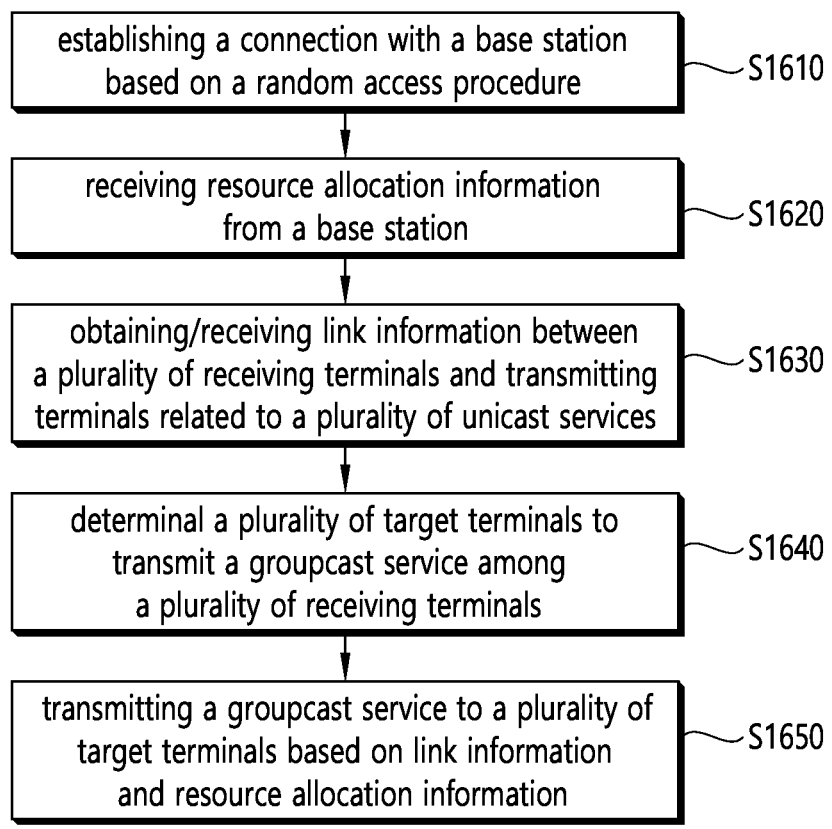
FIG. 16 is a flowchart illustrating an operation of a transmitting terminal according to another embodiment of the present disclosure.

FIG. 16 is a flowchart illustrating an operation of a transmitting terminal according to another embodiment of the present disclosure.

Referring to FIG. 16, in step S1610, the transmitting terminal may establish a connection with the base station based on the random access procedure. In step S1620, the transmitting terminal may receive resource allocation information from the base station. In step S1630, the transmitting terminal may obtain/receive link information between a plurality of receiving terminals related to a plurality of unicast services and the transmitting terminal. The transmitting terminal may obtain/receive the link information with respect to the receiving terminal that has established a unicast connection with the transmitting terminal.

In step S1640, among the plurality of receiving terminals, the transmitting terminal may determine a plurality of target terminals to which the groupcast service is to be transmitted. In one example, the plurality of target terminals may be determined based on mapping information determined and/or obtained by the transmitting terminal based on a plurality of unicast services between the transmitting terminal and the plurality of receiving terminals. In another example, the transmitting terminal may determine a plurality of target terminals to which the groupcast service will be transmitted, and mapping information may be determined and/or obtained based on the determination of the transmitting terminal.

In step S1650, the transmitting terminal may transmit the groupcast service to the plurality of target terminals based on the link information and the resource allocation information.

Figure 17:
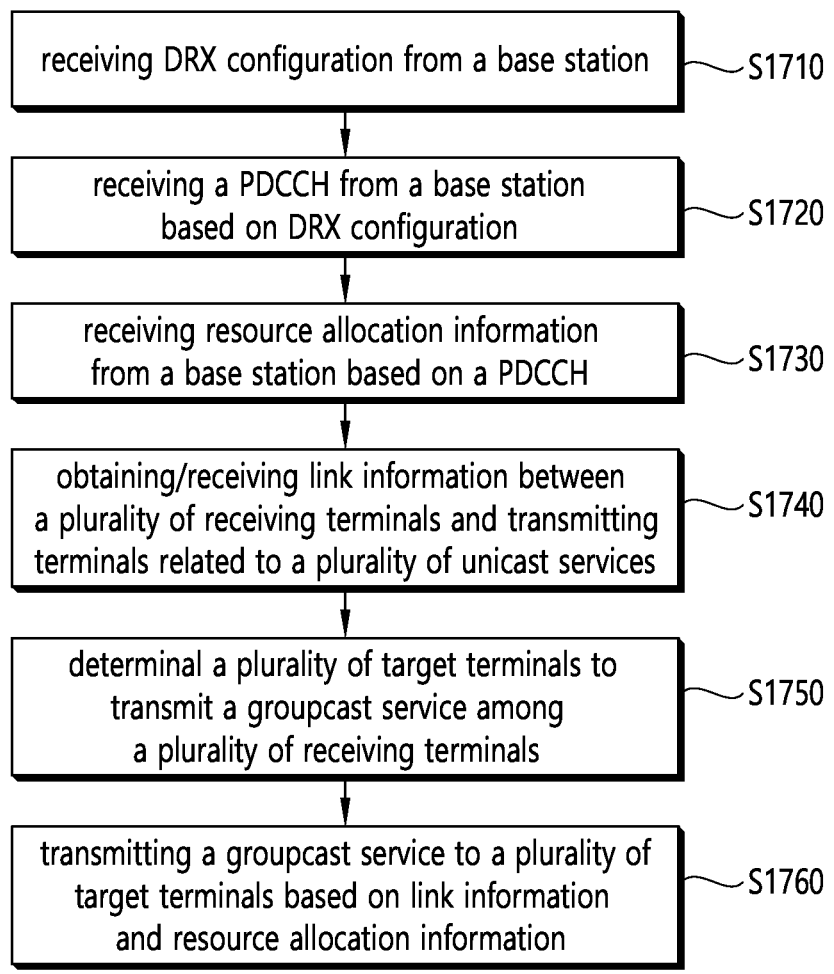
FIG. 17 is a flowchart illustrating an operation of a transmitting terminal according to the other embodiment of the present disclosure.

FIG. 17 is a flowchart illustrating an operation of a transmitting terminal according to the other embodiment of the present disclosure.

Referring to FIG. 17, in step S1710, the transmitting terminal may receive the DRX configuration from the base station. In step S1720, based on the DRX configuration, the transmitting terminal may receive the PDCCH from the base station. In step S1730, based on the PDCCH, the transmitting terminal may receive resource allocation information from the base station. In step S1740, the transmitting terminal may obtain/receive link information between a plurality of receiving terminals related to a plurality of unicast services and the transmitting terminal. The transmitting terminal may obtain/receive the link information with respect to the receiving terminal that has established a unicast connection with the transmitting terminal.

In step S1750, among the plurality of receiving terminals, the transmitting terminal may determine a plurality of target terminals to which the groupcast service is to be transmitted. In one example, the plurality of target terminals may be determined based on mapping information determined and/or obtained by the transmitting terminal based on a plurality of unicast services between the transmitting terminal and the plurality of receiving terminals. In another example, the transmitting terminal may determine a plurality of target terminals to which the groupcast service will be transmitted, and mapping information may be determined and/or obtained based on the determination of the transmitting terminal.

In step S1760, the transmitting terminal may transmit the groupcast service to the plurality of target terminals based on the link information and the resource allocation information.

Figure 18:
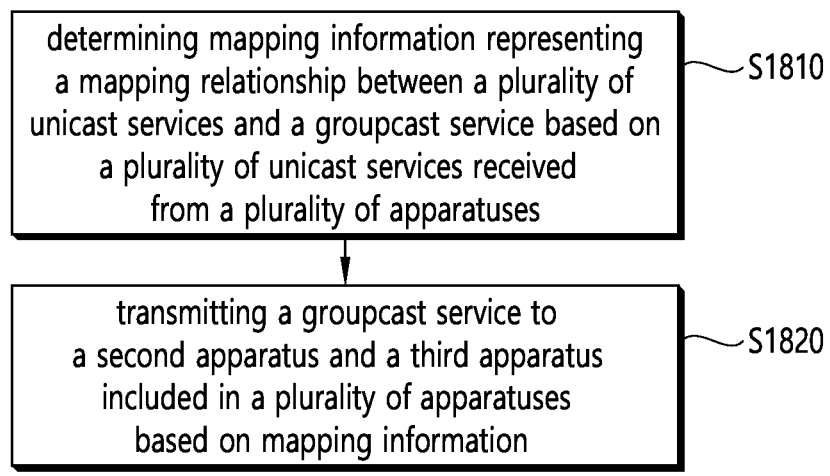
FIG. 18 is a flowchart illustrating an operation of a first apparatus according to an embodiment of the present disclosure.

FIG. 18 is a flowchart illustrating an operation of a first apparatus according to an embodiment of the present disclosure.

The operations disclosed in the flowchart of FIG. 18 may be performed in combination with various embodiments of the present disclosure. In one example, the operations disclosed in the flowchart of FIG. 18 may be performed based on at least one of the devices illustrated in FIGS. 20 to 25. In another example, the operations disclosed in the flowchart of FIG. 18 may be performed in combination with the operations illustrated in the flowcharts of FIGS. 15 to 17 in various ways.

In one example, the first apparatus of FIG. 18 may correspond to the first wireless device 100 of FIG. 21 to be described later. In another example, the first apparatus of FIG. 18 may correspond to the second wireless device 200 of FIG. 21 to be described later. In another example, the first device of FIG. 18 may correspond to the transmitting terminal described throughout the present disclosure. In another example, the second apparatus and/or the third apparatus of FIG. 18 may correspond to the target terminal 1 and/or the target terminal 2 described throughout the present disclosure.

In step S1810, the first apparatus according to an embodiment may determine mapping information representing a mapping relationship between the plurality of unicast services and the groupcast service based on the plurality of unicast services received from the plurality of apparatuses.

In step S1820, the first apparatus according to an embodiment may transmit the groupcast service to the second apparatus and the third apparatus included in the plurality of apparatuses based on the mapping information.

In an embodiment, the mapping information may represent a mapping relationship between at least one of information on a first unicast service received from the second apparatus or information on a second unicast service received from the third apparatus, and information on the groupcast service.

In an embodiment, the information on the first unicast service may include a first unicast destination ID or a first unicast source ID of the first unicast service. In addition, the information on the second unicast service may include a second unicast destination ID or a second unicast source ID of the second unicast service. Also, the information on the groupcast service may include a groupcast destination ID or a groupcast source ID of the groupcast service.

In an embodiment, the information on the first unicast service may represent the first unicast destination ID, the information on the second unicast service may represent the second unicast destination ID, and the information on the groupcast service may represent the groupcast destination ID.

The first apparatus according to an embodiment may obtain first link information representing link quality of the first unicast service based on the first unicast service received from the second apparatus. Also, the first apparatus may obtain second link information representing link quality of the second unicast service based on the second unicast service received from the third apparatus.

In an embodiment, the first link information may include a first pathloss value between the first apparatus and the second apparatus, the second link information may include a second pathloss value between the first apparatus and the second apparatus, and the transmission power of the groupcast service may be determined based on a larger value among the first pathloss value and the second pathloss value.

In an embodiment, the first link information may include a first reference signal received quality (RSRQ) value based on the first unicast service, the second link information may include a second RSRQ value based on the second unicast service, and the transmission parameter for the groupcast service may be determined based on the first RSRQ value and the second RSRQ value.

In an embodiment, the transmission parameter for the groupcast service may be determined based on a smaller value among the first RSRQ value and the second RSRQ value.

In an embodiment, the transmission parameter may be related to at least one of a Modulation Coding Scheme (MSC), an amount of resource, whether to retransmit, or an allowed maximum transmission power.

In an embodiment, the first link information may include a first channel state information (CSI) value based on the first unicast service, the second link information may include a second CSI value based on the second unicast service, and the transmission parameter for the groupcast service may be determined based on the first CSI value and the second CSI value.

In one embodiment, based on a determination that the second apparatus or the third apparatus is not located within a communication range associated with the groupcast service of the first apparatus, at least one of the first link information and the second link information may not be used in the transmission of the groupcast service. In this case, for example, the communication range related to the groupcast service of the first apparatus may be related to a minimum communication requirement of the groupcast service.

In another embodiment, based on a determination that the second apparatus or the third apparatus is not located within a communication range associated with the unicast service of the first apparatus, at least one of the first link information and the second link information may not be used in the transmission of the groupcast service. In this case, for example, the communication range related to the unicast service of the first apparatus may be related to a minimum communication requirement of the unicast service.

In one embodiment, based on a determination that a first unicast session for the first unicast service or a second unicast session for the second unicast service is released, at least one of the first link information and the second link information may not be used in the transmission of the groupcast service.

The first apparatus according to an embodiment may transmit the mapping information to the second apparatus and the third apparatus.

According to an embodiment of the present disclosure, a first apparatus transmitting a groupcast service may be provided. The first apparatus may include: at least one memory storing instructions, at least one transceiver and at least one processor connecting the at least one memory and the at least one transceiver, wherein the at least one processor is configured to: determine mapping information representing a mapping relationship between a plurality of unicast services and a groupcast service based on the plurality of unicast services received from a plurality of apparatuses, and control the at least one transceiver to transmit the groupcast service to a second apparatus and a third apparatus included in the plurality of apparatuses based on the mapping information.

According to an embodiment of the present disclosure, an apparatus (or a chip (set)) for controlling the first terminal may be provided. The apparatus may include: at least one processor and at least one computer memory operably coupled by the at least one processor and storing instructions, wherein, by the at least one processor executing the instructions, the first terminal is configured to: determine mapping information representing a mapping relationship between a plurality of unicast services and a groupcast service based on the plurality of unicast services received from a plurality of apparatuses, and transmit the groupcast service to a second apparatus and a third apparatus included in the plurality of apparatuses based on the mapping information.

In one example, the first terminal of the embodiment may refer to the first apparatus described throughout the present disclosure. In one example, each of the at least one processor, the at least one memory, and the like in the apparatus for controlling the first terminal may be implemented as a separate sub chip, or at least two or more components may be implemented through a sub-chip.

According to an embodiment of the present disclosure, a non-transitory computer-readable storage medium storing instructions may be provided. Based on the instructions being executed by at least one processor of the non-transitory computer-readable storage medium: mapping information representing a mapping relationship between a plurality of unicast services and a groupcast service is determined by a first apparatus based on the plurality of unicast services received from a plurality of apparatuses, and the groupcast service is transmitted by the first apparatus to a second apparatus and a third apparatus included in the plurality of apparatuses based on the mapping information FIG. 19 is a flowchart illustrating an operation of a second apparatus according to an embodiment of the present disclosure.

Figure 19:
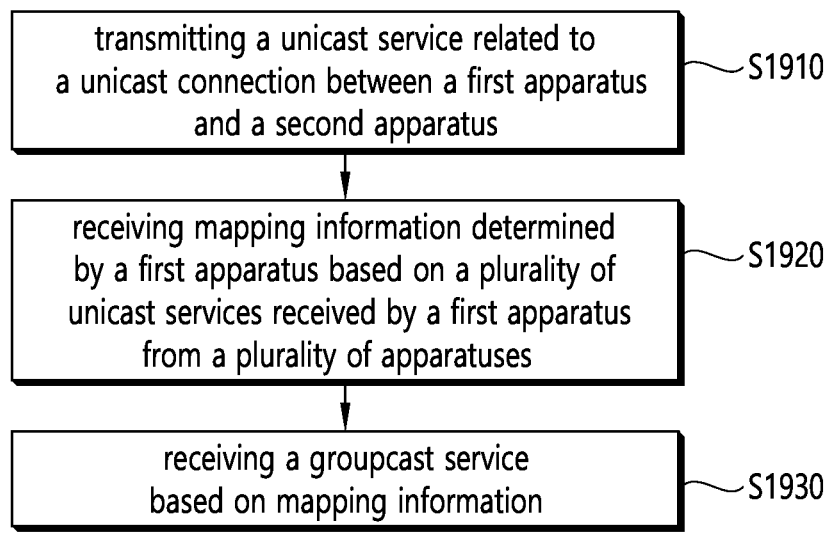
FIG. 19 is a flowchart illustrating an operation of a second apparatus according to an embodiment of the present disclosure.

The operations disclosed in the flowchart of FIG. 19 may be performed in combination with various embodiments of the present disclosure. In one example, the operations disclosed in the flowchart of FIG. 19 may be performed based on at least one of the apparatuses illustrated in FIGS. 20 to 25. In another example, the operations disclosed in the flowchart of FIG. 19 may be performed in combination with the operations illustrated in the flowcharts of FIGS. 15 to 17 in various ways.

In one example, the second apparatus of FIG. 19 may correspond to the second wireless device 200 of FIG. 21, which will be described later. In another example, the second apparatus of FIG. 19 may correspond to the first wireless device 100 of FIG. 21, which will be described later. In another example, the first device of FIG. 19 may correspond to the transmitting terminal described throughout the present disclosure. In another example, the second apparatus and/or the third apparatus of FIG. 19 may correspond to the target terminal 1 and/or the target terminal 2 described throughout the present disclosure.

In step S1910, the second apparatus according to an embodiment may transmit a unicast service related to a unicast connection between the first apparatus and the second apparatus to the first apparatus.

In step S1920, the second apparatus according to an embodiment may receive the mapping information, determined by the first apparatus based on the plurality of unicast services received by the first apparatus from the plurality of apparatuses, from the first apparatus.

In step S1930, the second apparatus according to an embodiment may receive the groupcast service based on the mapping information from the first apparatus.

In an embodiment, the plurality of apparatuses may include the second apparatus, the plurality of unicast services may include the unicast service, and the mapping information may represent a mapping relationship between the plurality of unicast services and the groupcast service.

In an embodiment, the mapping information may represent a mapping relationship between at least one of information on a first unicast service between the second apparatus and the first apparatus or information on a second unicast service between a third apparatus and the first apparatus and information on the groupcast service.

In an embodiment, the information on the first unicast service may include a first unicast destination ID or a first unicast source ID of the first unicast service. In addition, the information on the second unicast service may include a second unicast destination ID or a second unicast source ID of the second unicast service. Also, the information on the groupcast service may include a groupcast destination ID or a groupcast source ID of the groupcast service.

In an embodiment, the information on the first unicast service may represent the first unicast destination ID, the information on the second unicast service may represent the second unicast destination ID, and the information on the groupcast service may represent the groupcast destination ID.

The first apparatus according to an embodiment may obtain first link information representing link quality of the first unicast service based on the first unicast service received from the second apparatus. Also, the first apparatus may obtain second link information representing link quality of the second unicast service based on the second unicast service received from the third apparatus.

In an embodiment, the first link information may include a first pathloss value between the first apparatus and the second apparatus, the second link information may include a second pathloss value between the first apparatus and the second apparatus, and the transmission power of the groupcast service may be determined based on a larger value among the first pathloss value and the second pathloss value.

In an embodiment, the first link information may include a first reference signal received quality (RSRQ) value based on the first unicast service, the second link information may include a second RSRQ value based on the second unicast service, and the transmission parameter for the groupcast service may be determined based on the first RSRQ value and the second RSRQ value.

In an embodiment, the transmission parameter for the groupcast service may be determined based on a smaller value among the first RSRQ value and the second RSRQ value.

In an embodiment, the transmission parameter may be related to at least one of a Modulation Coding Scheme (MSC), an amount of resource, whether to retransmit, or an allowed maximum transmission power.

In an embodiment, the first link information may include a first channel state information (CSI) value based on the first unicast service, the second link information may include a second CSI value based on the second unicast service, and the transmission parameter for the groupcast service may be determined based on the first CSI value and the second CSI value.

In one embodiment, based on a determination that the second apparatus or the third apparatus is not located within a communication range associated with the groupcast service of the first apparatus, at least one of the first link information and the second link information may not be used in the transmission of the groupcast service. In this case, for example, the communication range related to the groupcast service of the first apparatus may be related to a minimum communication requirement of the groupcast service.

In another embodiment, based on a determination that the second apparatus or the third apparatus is not located within a communication range associated with the unicast service of the first apparatus, at least one of the first link information and the second link information may not be used in the transmission of the groupcast service. In this case, for example, the communication range related to the unicast service of the first apparatus may be related to a minimum communication requirement of the unicast service.

In one embodiment, based on a determination that a first unicast session for the first unicast service or a second unicast session for the second unicast service is released, at least one of the first link information and the second link information may not be used in the transmission of the groupcast service.

The first apparatus according to an embodiment may transmit the mapping information to the second apparatus and the third apparatus.

According to an embodiment of the present disclosure, a second apparatus receiving a groupcast service may be provided. The second apparatus may include at least one memory storing instructions, at least one transceiver and at least one processor connecting the at least one memory and the at least one transceiver, wherein the at least one processor is configured to: control the at least one transceiver to transmit a unicast service related to a unicast connection between a first apparatus and the second apparatus to the first apparatus, control the at least one transceiver to receive, from the first apparatus, mapping information determined by the first apparatus based on a plurality of unicast services received by the first apparatus from a plurality of apparatuses, and control the at least one transceiver to receive the groupcast service based on the mapping information from the first apparatus, wherein the plurality of apparatuses includes the second apparatus, wherein the plurality of unicast services include the unicast service, and wherein the mapping information represents a mapping relationship between the plurality of unicast services and the groupcast service.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
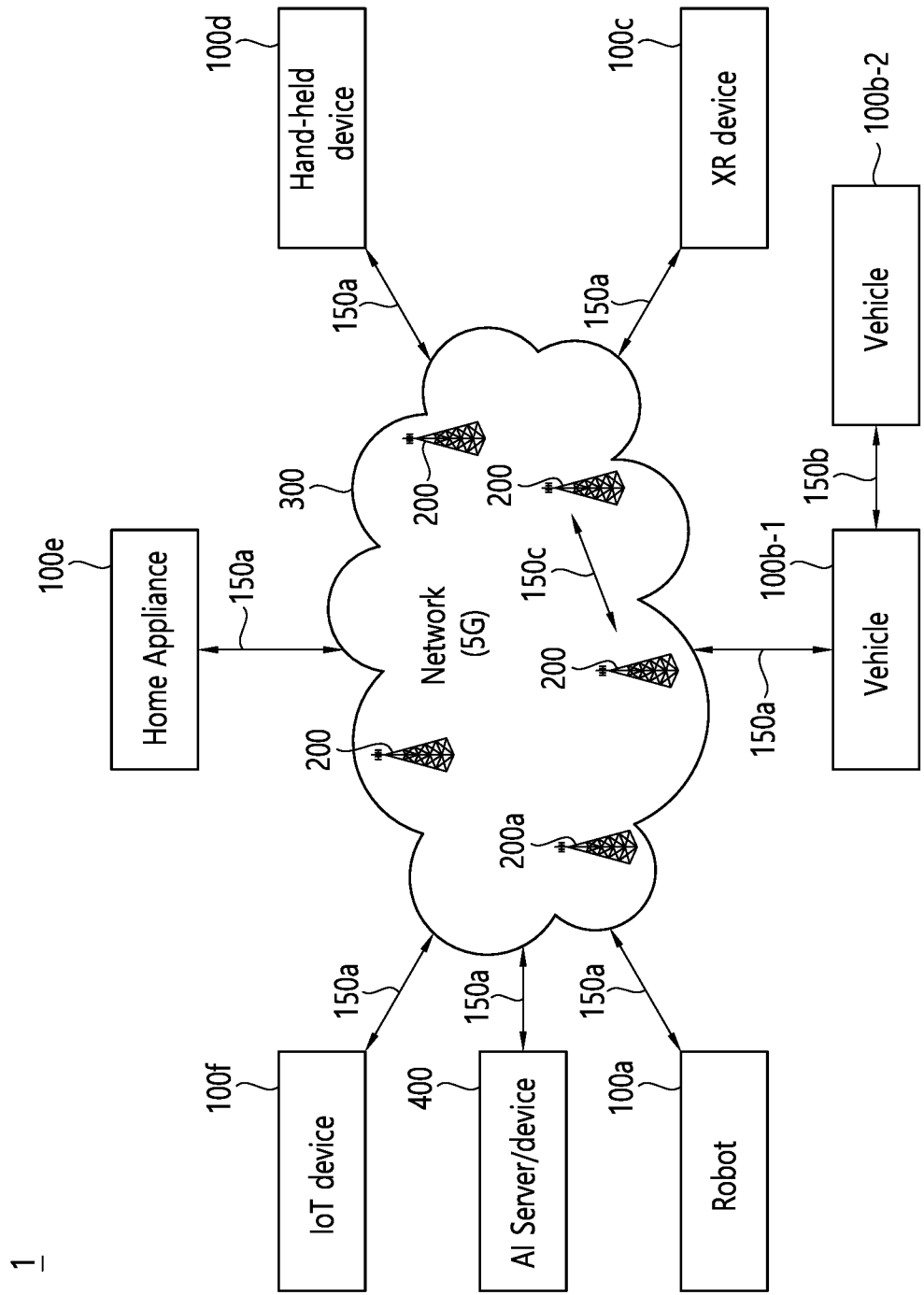
FIG. 20 shows a communication system 1, in accordance with an embodiment of the present disclosure.

FIG. 20 shows a communication system 1, in accordance with an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
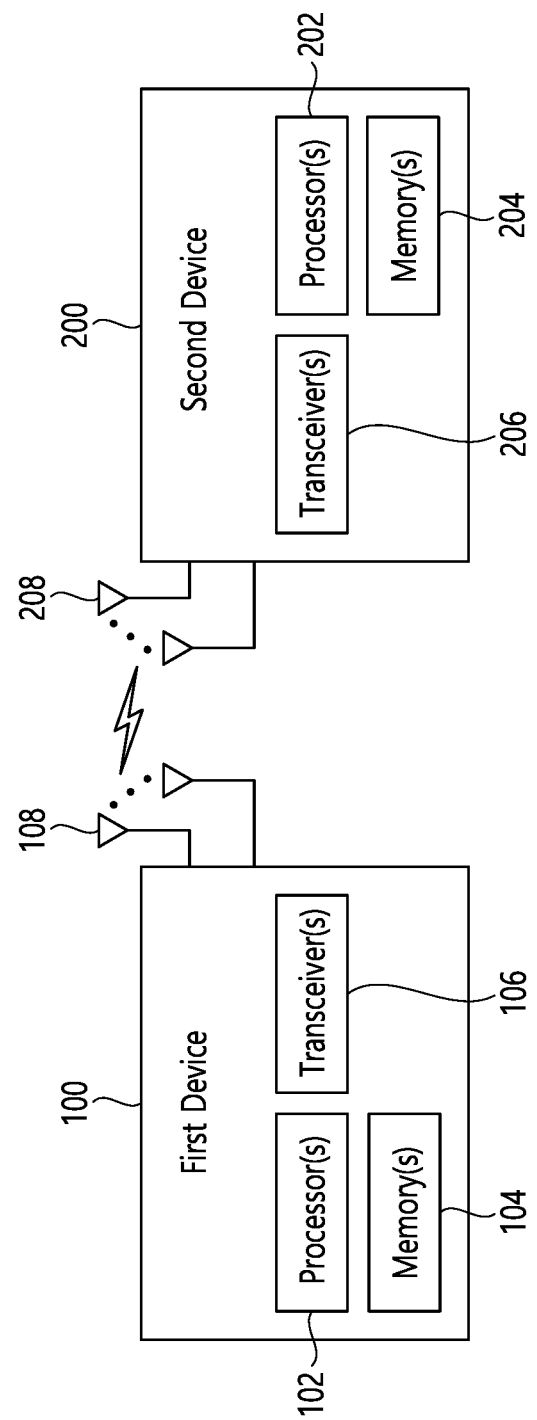
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
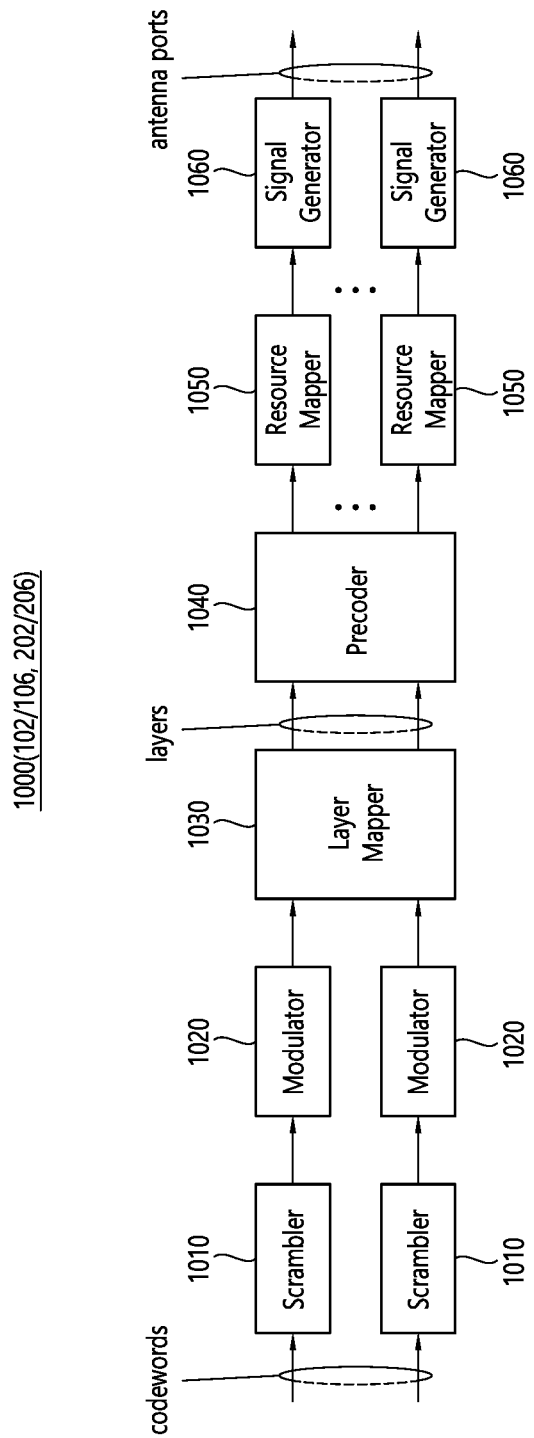
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed by, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
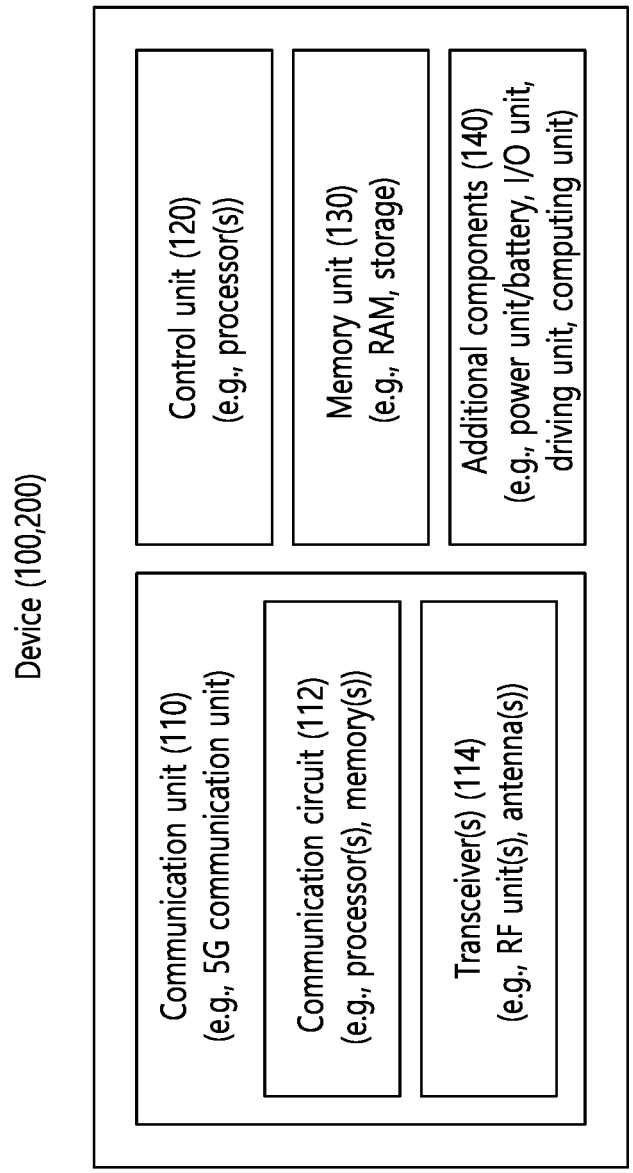
FIG. 23 shows a wireless device, in accordance with an embodiment of the present disclosure.

FIG. 23 shows a wireless device, in accordance with an embodiment of the present disclosure. The wireless device may be implemented in various forms according to a use-case/service (see FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
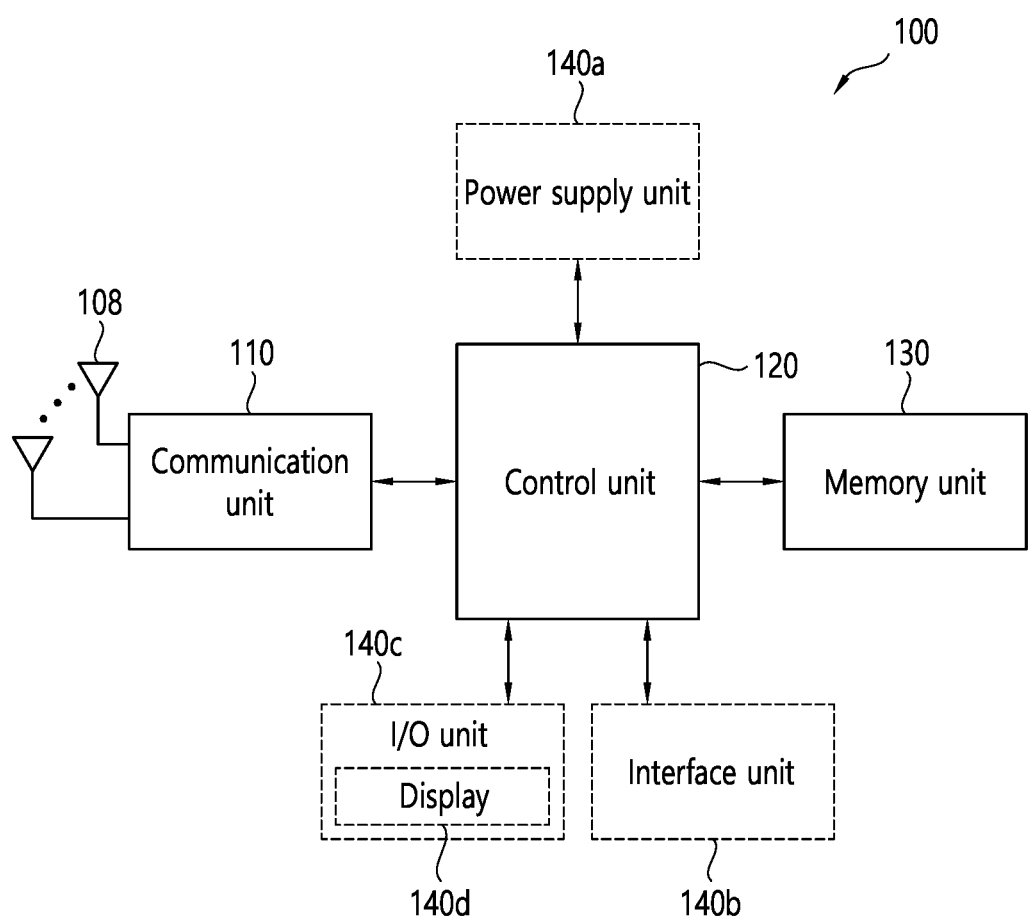
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
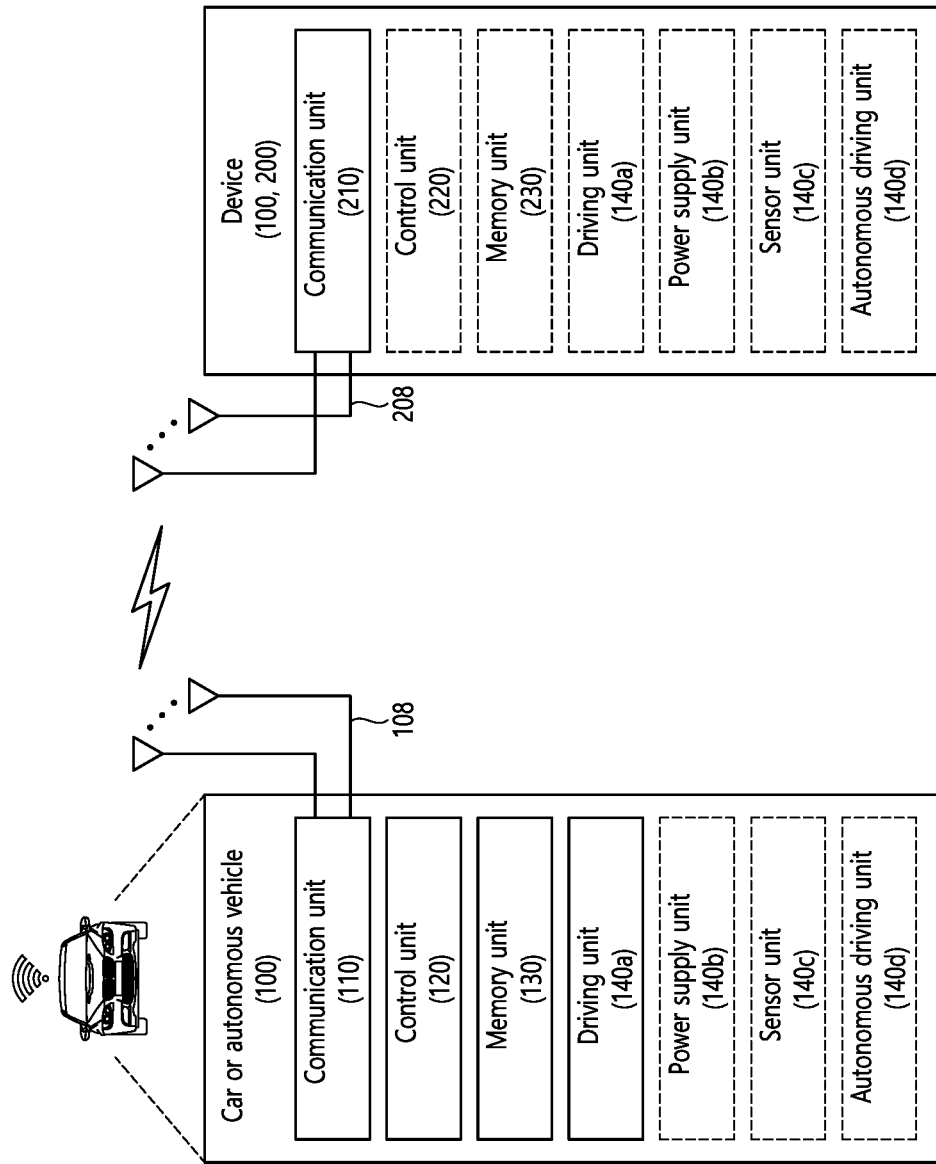
FIG. 25 shows a car or an autonomous vehicle, in accordance with an embodiment of the present disclosure.

FIG. 25 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 25, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first apparatus, the method including:
establishing a first unicast connection with a second apparatus;
obtaining a first pathloss value between the first apparatus and the second apparatus;
establishing a second unicast connection with a third apparatus;
obtaining a second pathloss value between the first apparatus and the third apparatus;
determining transmission power for groupcast communication related to the first unicast connection and the second unicast connection, based on a larger value of the first pathloss value and the second pathloss value; and
performing the groupcast communication, based on the transmission power.

2. The method of claim 1, further including:
determining mapping information for the groupcast communication, wherein the mapping information represents a mapping relationship between at least one of a first unicast service received from the second apparatus or a second unicast service received from the third apparatus and a groupcast service related to the groupcast communication.

3. The method of claim 2,
wherein the first unicast service includes a first unicast destination identification (ID) or a first unicast source ID of the first unicast service,
wherein the second unicast service includes a second unicast destination ID or a second unicast source ID of the second unicast service, and
wherein the groupcast service includes a groupcast destination ID or a groupcast source ID of the groupcast service.

4. The method of claim 1, wherein at least one of the first pathloss value or the second pathloss value is not used for the groupcast communication, based on a determination that the second apparatus or the third apparatus is not located in a communication range related to the groupcast communication.

5. The method of claim 1, wherein at least one of the first pathloss value or the second pathloss value is not used for the groupcast communication, based on a determination that a first unicast session related to the first unicast connection or a second unicast session related to the second unicast connection is released.

6. A first apparatus adapted to perform wireless communication, the first apparatus comprising:
- at least one transceiver;
- at least one processor; and
- at least one memory connected to the at least one processor and storing instructions that, based on being executed, cause the at least one processor to perform operations comprising:
- establishing a first unitcast connectoin with a second apparatus;
- obtaining a first pathloss value between the first apparatus and the second apparatus;
- establishing a second unicast connection with a third apparatus;
- obtaining a second pathloss value between the first apparatus and the third apparatus;
- determining transmission power for groupcast communication related to the first unicast connection and the second unicast connection, based on a larger value of the first pathloss value and the second pathloss value; and
- performing the groupcast communication, based on the transmission power.

7. A processing device adapted to control a first apparatus to perform wireless communication on a bandwidth part (BWP), the processing device comprising:
- at least one processor; and
- at least one memory connected to the at least one processor and storing instructions that, based on being executed, cause the at least one processor to perform operations comprising:
- establishing a first unicast connection with a second apparatus;
- obtaining a first pathloss value between the first apparatus and the second apparatus;
- establishing a second unicast connection with a third apparatus;
- obtaining a second pathloss value between the first apparatus and the third apparatus;
- determining transmission power for groupcast communication related to the first unicast connection and the second unicast connection, based on a larger value of the first pathloss value and the second pathloss value; and
- performing the groupcast communication, based on the transmission power.

* * * * *